US012612574B2

(12) United States Patent
Adhvaryu et al.

(10) Patent No.: US 12,612,574 B2
(45) Date of Patent: Apr. 28, 2026

(54) ESTER BLENDS FOR ELECTRIC DRIVE AND COOLING APPLICATION

(71) Applicant: AURORIUM HOLDINGS LLC, Indianapolis, IN (US)

(72) Inventors: Atanu Adhvaryu, Glen Allen, VA (US); Kenneth Crook, Winston Salem, NC (US); Carlos Curiel, Denham Springs, LA (US); Katherine Glasgow, Indianapolis, IN (US); Matthew Stephens, Cranston, RI (US)

(73) Assignee: AURORIUM HOLDINGS LLC, Indianapolis, IN (US)

(*) Notice: Subject to any disclaimer, the term of this patent is extended or adjusted under 35 U.S.C. 154(b) by 0 days.

(21) Appl. No.: 18/820,886

(22) Filed: Aug. 30, 2024

(65) Prior Publication Data

US 2025/0101331 A1 Mar. 27, 2025

Related U.S. Application Data

(60) Provisional application No. 63/585,036, filed on Sep. 25, 2023.

(51) Int. Cl.
*C10M 105/36* (2006.01)
*C09K 5/10* (2006.01)
(Continued)

(52) U.S. Cl.
CPC ............. *C10M 105/36* (2013.01); *C09K 5/10* (2013.01); *C10M 105/34* (2013.01); *C10M 2207/2815* (2013.01); *C10M 2207/2825* (2013.01); *C10N 2020/02* (2013.01); *C10N 2030/02* (2013.01); *C10N 2030/08* (2013.01);
(Continued)

(58) Field of Classification Search
CPC ............. C10M 105/36; C10M 105/34; C10M 2207/2815; C10M 2207/2825; C10M 2207/2895; C10M 105/40; C09K 5/10; C10N 2020/02; C10N 2030/02; C10N 2030/08; C10N 2040/04; C10N 2040/16; C10N 2040/25; C10N 2030/06
See application file for complete search history.

(56) References Cited

U.S. PATENT DOCUMENTS 5,367,087 A 11/1994 Murahashi
5,635,165 A 6/1997 Panitch
(Continued)

FOREIGN PATENT DOCUMENTS

CN 114573512 6/2022
DE 2738878 9/1978
(Continued)

OTHER PUBLICATIONS

PCT Search Report and Written Opinion prepared for PCT Application No. PCT/US2024/044677, completed Nov. 27, 2024, mailed Dec. 5, 2024.

*Primary Examiner* — Ellen M McAvoy
(74) *Attorney, Agent, or Firm* — Barnes & Thornburg LLP

(57) ABSTRACT

This disclosure relates to oil compositions of ester blends that are useful in the chemical arts, such as in the manufacture of products, such as base oils and battery immersive cooling fluids. In particular, the present disclosure pertains to blends of an alkenylene diester, such as a dialkyl fumarate or a dialkyl maleate, and a compound of Formula I.

20 Claims, 7 Drawing Sheets

(51) Int. Cl.

| | |
|---|---|
| ***C10M 105/34*** | (2006.01) |
| *C10N 20/02* | (2006.01) |
| *C10N 30/02* | (2006.01) |
| *C10N 30/08* | (2006.01) |
| *C10N 40/04* | (2006.01) |
| *C10N 40/16* | (2006.01) |
| *C10N 40/25* | (2006.01) |

(52) U.S. Cl.
CPC ...... *C10N 2040/04* (2013.01); *C10N 2040/16* (2013.01); *C10N 2040/25* (2013.01)

(56) References Cited

U.S. PATENT DOCUMENTS

| | | | | |
|---|---|---|---|---|
| 6,030,544 | A | 2/2000 | Yokota | |
| 6,495,071 | B1 | 12/2002 | Yokota | |
| 6,858,634 | B2 | 2/2005 | Asrar | |
| 7,102,045 | B2 | 9/2006 | Krauter | |
| 7,795,193 | B2 | 9/2010 | Takei et al. | |
| 8,617,434 | B2 | 12/2013 | Rapp et al. | |
| 8,729,320 | B2 | 5/2014 | Amii | |
| 9,624,435 | B2 | 4/2017 | Fujita | |
| 11,085,006 | B2 * | 8/2021 | Kwak | C10M 169/044 |
| 11,111,450 | B2 | 9/2021 | Liang et al. | |
| 11,155,705 | B2 | 10/2021 | Moriwaki | |
| 11,465,135 | B2 | 10/2022 | Ha | |
| 12,091,382 | B2 | 9/2024 | Higashi | |
| 2003/0181555 | A1 | 9/2003 | Figuly | |
| 2004/0151774 | A1 | 8/2004 | Pauletti | |
| 2008/0283803 | A1 | 11/2008 | Rapp et al. | |
| 2010/0113664 | A1 | 5/2010 | Bradshaw | |
| 2010/0204438 | A1 | 8/2010 | Cauwenberge | |
| 2011/0282084 | A1 * | 11/2011 | Potula | C11C 3/00 554/219 |
| 2015/0247104 | A1 * | 9/2015 | Brekan | C10M 169/042 508/496 |
| 2015/0274972 | A1 | 10/2015 | Mateu | |
| 2016/0194455 | A1 | 7/2016 | Mateu | |
| 2020/0279670 | A1 * | 9/2020 | Lebrun | H01B 3/20 |
| 2021/0139805 | A1 * | 5/2021 | Champagne | C10M 169/04 |
| 2022/0131205 | A1 * | 4/2022 | Champagne | H01M 10/36 |
| 2022/0332997 | A1 | 10/2022 | Lebrun et al. | |
| 2023/0313067 | A1 * | 10/2023 | Grzyska | H02K 9/19 |
| 2023/0322649 | A1 | 10/2023 | Higashi | |
| 2024/0026245 | A1 | 1/2024 | Wong | |
| 2024/0309286 | A1 | 9/2024 | Verroul | |
| 2025/0011275 | A1 * | 1/2025 | Jovic | C07C 69/24 |

FOREIGN PATENT DOCUMENTS

| | | | |
|---|---|---|---|
| EP | 0303523 | | 2/1989 |
| EP | 787792 | | 8/1997 |
| EP | 1136545 | | 9/2001 |
| EP | 1662513 | A1 | 5/2006 |
| EP | 2508591 | | 10/2012 |
| EP | 2705128 | B1 | 10/2022 |
| ES | 2336746 | | 4/2010 |
| JP | 2010106009 | | 5/2010 |
| JP | 2010209016 | | 9/2010 |
| JP | 2015105326 | | 6/2015 |
| WO | 1989001293 | | 2/1989 |
| WO | 9428061 | | 12/1994 |
| WO | 2002085983 | | 10/2002 |
| WO | 2010119382 | | 10/2010 |
| WO | 2012095667 | | 7/2012 |
| WO | 2013104877 | | 7/2013 |
| WO | 2013150112 | | 10/2013 |
| WO | 2014128564 | | 8/2014 |
| WO | 2018137260 | | 8/2018 |
| WO | 2018145219 | | 8/2018 |
| WO | 2019138600 | | 7/2019 |
| WO | 2019139069 | | 7/2019 |
| WO | 2019168269 | | 9/2019 |
| WO | 2020115177 | | 6/2020 |
| WO | 2021161851 | | 8/2021 |
| WO | 2022041462 | | 3/2022 |
| WO | 2023164280 | | 8/2023 |
| WO | 2024008805 | | 1/2024 |
| WO | 2024264013 | | 12/2024 |
| WO | 2025105315 | | 5/2025 |

* cited by examiner

A.

B.

C.

ESTER BLENDS FOR ELECTRIC DRIVE AND COOLING APPLICATION

RELATED APPLICATIONS

This application claims the benefit of U.S. Provisional Application No. 63/585,036, filed Sep. 25, 2023, the entire disclosure of which is incorporated herein by reference.

BACKGROUND

Base oils can be used in automotive applications such as engine oils, transmission and gear lubricants, and greases. Base oils are typically the main component of engine oils or cooling fluids, along with other additives such as lubrication aids, corrosion inhibitors, detergents, dispersants, antioxidants, and viscosity modifiers, among others.

Typical base oils are produced through refining crude oil to isolate components of desired viscosity. Therefore, base oils are typically petroleum based. Fluids based on bio-origin are sought to provide greener base oil alternatives while maintaining performance. Compositions including bio-based esters, such as fatty acid esters based on mineral and vegetable oils, have been proposed.

Current industry trends are focusing on low viscosity fluids that can increase system efficiency while maintaining good lubricant and cooling properties (flash point, evaporation, thermal degradation, electrical conductivity, thermal conductivity, etc.).

Electrical conductivity is considered to determine the suitability of oil compositions used as electric drive fluid (EDF) and/or coolant fluid. Low electrical conductivity is particularly important for fluids used in electric vehicles. For example, oil compositions used in electric motors are designed to deliver appropriate low conductivity to prevent charge build-up and prevent arcing that can cause hardware damage. External factors such as temperature, time, and moisture content can alter fluid conductivity. Polar components arising from oxidation will also increase the ability of the lubricant to carry charge. For optimal performance, EDF is expected to deliver low and stable electrical conductivity over the operational life of the fluid.

Battery thermal management is also considered for the suitability of oil compositions for use in electric vehicles (EVs). Cells may need to be kept cool when under load from driving and charging or kept warm during cold ambient conditions. This enables more efficient operation of the batteries and improves safety. In some examples, cooling is done via a water cold plate at the base of the battery pack or via water coolant channels between the cells. Immersion cooling is a promising thermal management technology that may increase battery longevity, but there are certainly barriers to adoption. The initial concern for most is the weight of the fluids. For example, heavy hydrofluoroether products that often have densities above 1.5 g/cm$^3$. However, the use of other types of dielectric fluids, like synthetic esters or other oil mixtures, can provide fluids with densities below that of water (1 g/cm$^3$).

Accordingly, there remains a need for improved base oil compositions and cooling fluid compositions that target a low viscosity, and also deliver high thermal stability and low electrical conductivity.

SUMMARY

In one aspect, the present disclosure provides an oil composition comprising a blend of (i) an alkenylene diester and (ii) a compound of Formula I, (I)

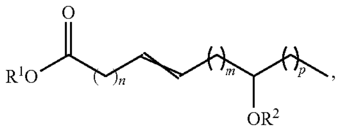

or salt thereof, wherein $R^1$ is alkyl, $R^2$ is H or acyl, and each of n, m, and p is independently an integer of 1, 2, 3, 4, 5, 6, 7, 8, 9, or 10.

In another aspect, the disclosure relates to an oil composition comprising a blend of a dialkyl fumarate and an alkyl ricinoleate.

In another aspect, the present disclosure provides a base oil composition comprising the oil composition as described herein.

In another aspect, the present disclosure provides a cooling fluid comprising the oil composition as described herein.

In another aspect, the present disclosure provides an additive for a base oil composition comprising the oil composition as described herein.

In another aspect, the present disclosure provides an additive for a cooling fluid comprising the oil composition as described herein.

In yet another aspect, the present disclosure provides a method of cooling an electric drive, comprising adding a composition to the electric drive, wherein the composition comprises the oil composition as described herein.

In yet another aspect, the present disclosure provides a process of preparing an oil composition blend comprising the composition as described herein, comprising: combining an alkenylene diester and a compound of Formula I, and mixing for at least 5 minutes.

In yet another aspect, the present disclosure provides a process of preparing an oil composition blend comprising the composition as described herein, comprising: combining (i) a dialkyl fumarate and (ii) an alkyl ricinoleate and mixing for at least 5 minutes.

Additional embodiments, features, and advantages of the disclosure will be apparent from the following detailed description and through practice of the disclosure. The compounds and methods of the present disclosure can be described as embodiments in any of the following enumerated clauses. It will be understood that any of the embodiments described herein can be used in connection with any other embodiments described herein to the extent that the embodiments do not contradict one another.

DETAILED DESCRIPTION

Figure 1:
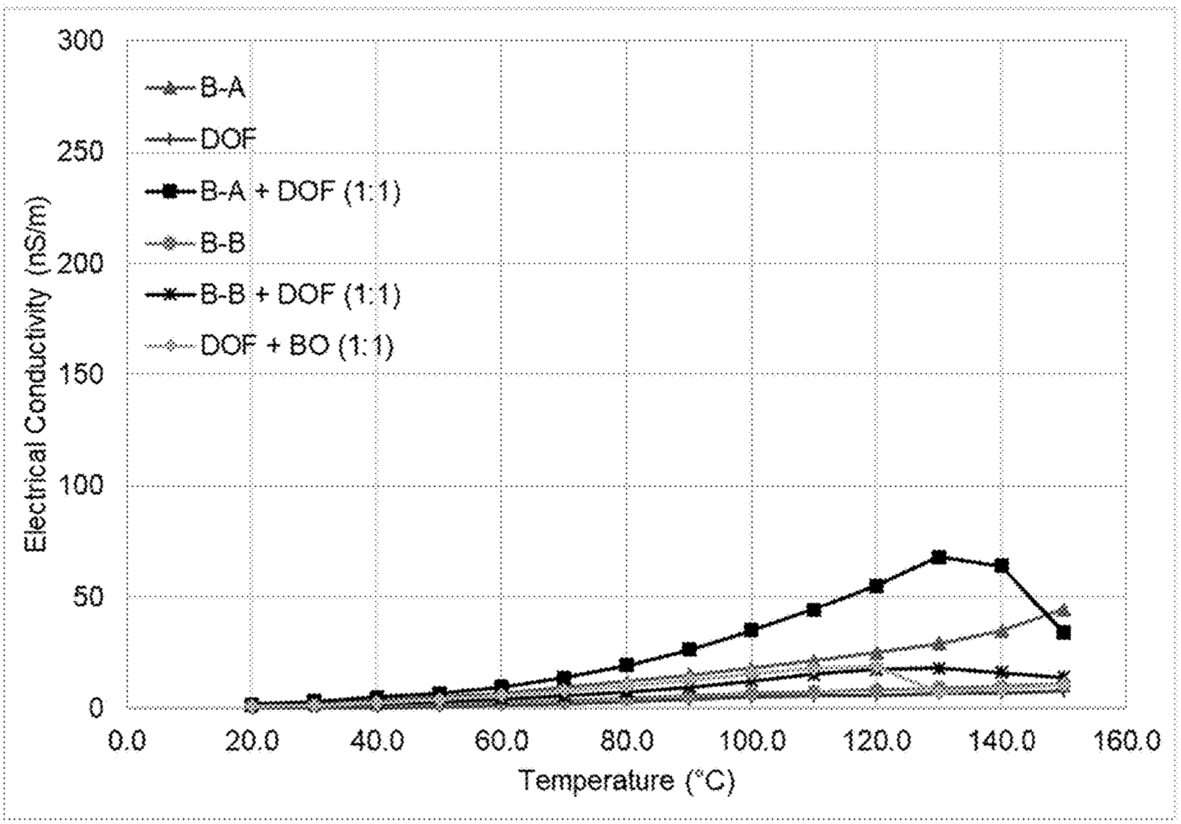
FIG. 1 shows a graph of electrical conductivity vs. temperature of different esters and ester blends. Bio-ester A (B-A) is methyl ricinoleate A, Bio-ester B (B-B) is methyl ricinoleate B, Syn-ester A is dioctyl fumarate (DOF), and Bio-oil (BO) is castor oil.

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended clauses.

For the sake of brevity, the disclosures of the publications cited in this specification, including patents, are herein incorporated by reference. Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

As used herein and in the appended clauses, the singular forms "a," "an," and "the" include plural referents unless the context clearly dictates otherwise. It is further noted that the clauses may be drafted to exclude any optional element. As such, this statement is intended to serve as antecedent basis for use of such exclusive terminology as "solely," "only" and the like in connection with the recitation of clause elements, or use of a "negative" limitation.

As used herein, the terms "including," "containing," and "comprising" are used in their open, non-limiting sense.

To provide a more concise description, some of the quantitative expressions given herein are not qualified with the term "about." It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. Whenever a yield is given as a percentage, such yield refers to a mass of the entity for which the yield is given with respect to the maximum amount of the same entity that could be obtained under the particular stoichiometric conditions. Concentrations that are given as percentages refer to mass ratios, unless indicated differently.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described. All publications mentioned herein are incorporated herein by reference to disclose and describe the methods and/or materials in connection with which the publications are cited.

Except as otherwise noted, the methods and techniques of the present embodiments are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

Chemical nomenclature for compounds described herein has generally been derived using the commercially-available ACD/Name 2014 (ACD/Labs) or ChemBioDraw Ultra 13.0 (Perkin Elmer).

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. All combinations of the embodiments pertaining to the chemical groups represented by the variables are specifically embraced by the present disclosure and are disclosed herein just as if each and every combination was individually and explicitly disclosed, to the extent that such combinations embrace compounds that are stable compounds (i.e., compounds that can be isolated, characterized, and tested for biological activity). In addition, all subcombinations of the chemical groups listed in the embodiments describing such variables are also specifically embraced by the present disclosure and are disclosed herein just as if each and every such subcombination of chemical groups was individually and explicitly disclosed herein.

Definitions

Unless otherwise defined herein, scientific and technical terms used in this application shall have the meanings that are commonly understood by those of ordinary skill in the art. Generally, nomenclature used in connection with, and techniques of, chemistry, polymers, and materials chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification.

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, Calif. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

As used herein, the terms "salt" or "or salt thereof" is used to refer to an acid addition salt or a base addition salt of compounds of present disclosure. The selection of the appropriate salt will be known to a person skilled in the art.

The term "acid addition salt" as used herein means any organic or inorganic salt of any base compounds of present disclosure. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids.

The term "base addition salt" as used herein means any organic or inorganic salt of any acid compounds of present disclosure. Illustrative inorganic bases which form suitable salts include lithium, sodium, potassium, calcium, magnesium, or barium hydroxide. Illustrative organic bases which form suitable salts include aliphatic, alicyclic, or aromatic organic amines such as methylamine, trimethylamine and picoline or ammonia.

In certain embodiments, contemplated salts of the disclosure include, but are not limited to, alkyl, dialkyl, trialkyl or tetra-alkyl ammonium salts. In certain embodiments, contemplated salts of the disclosure include, but are not limited to, L-arginine, benenthamine, benzathine, betaine, calcium choline, hydroxide, deanol, diethanolamine, diethylamine, 2-(diethylamino) ethanol, ethanolamine, ethylenediamine, N-methylglucamine, hydrabamine, 1H-imidazole, lithium, L-lysine, magnesium, 4-(2-hydroxyethyl) morpholine, piperazine, potassium, 1-(2-hydroxyethyl) pyrrolidine, sodium, triethanolamine, tromethamine, and zinc salts. In certain embodiments, contemplated salts of the disclosure include, but are not limited to, Na, Ca, K, Mg, Zn or other metal salts. In certain embodiments, contemplated salts of the disclosure include, but are not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, 1-ascorbic acid, 1-aspartic acid, benzenesulfonic acid, benzoic acid, (+)-camphoric acid, (+)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, d-glucoheptonic acid, d-gluconic acid, d-glucuronic acid, glutamic acid, glutaric acid, glycerophosphoric acid, glycolic acid, hippuric acid, hydrobromic acid, hydrochloric acid, isobutyric acid, lactic acid, lactobionic acid, lauric acid, maleic acid, 1-malic acid, malonic acid, mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, 1-pyroglutamic acid, salicylic acid, sebacic acid, stearic acid, succinic acid, sulfuric acid, 1-tartaric acid, thiocyanic acid, p-toluenesulfonic acid, trifluoroacetic acid, and undecylenic acid salts.

The term "acyl" is art-recognized and refers to a group represented by the general formula hydrocarbylC(O)—, preferably alkylC(O)—. An illustrative acyl group is acetyl (i.e., —C(O)$CH_3$).

The term "alkyl" refers to a monovalent saturated aliphatic group, including a straight-chain alkyl group, a branched-chain alkyl group, a cycloalkyl (alicyclic) group, an alkyl-substituted cycloalkyl group, and a cycloalkyl-substituted alkyl group. The term "alkylene" refers to a straight (i.e., linear)- or branched-chain divalent saturated aliphatic group. In preferred embodiments, a straight (i.e., linear) chain or branched chain alkyl or alkylene has 20 or fewer carbon atoms in its backbone (e.g., $C_{1-20}$ or for straight (i.e., linear) chains, $C_{3-20}$ for branched chains), and more preferably 12 or fewer.

Moreover, the terms "alkyl" and "alkylene" as used throughout the specification, examples, and claims is intended to include both unsubstituted and substituted alkyl and alkylene groups, the latter of which refers to alkyl or alkylene moieties having substituents replacing a hydrogen on one or more carbons of the hydrocarbon backbone, including haloalkyl groups such as trifluoromethyl and 2,2,2-trifluoroethyl, etc.

The term "alkenyl" refers to a monovalent straight- or branched-chain hydrocarbyl group having one or more double bonds. The term "alkenylene" refers to a divalent straight- or branched-chain hydrocarbyl group having one or more double bonds. In some embodiments, it can be advantageous to limit the number of atoms in an "alkenyl" or "alkenylene" to a specific range of atoms, such as $C_2$-$C_{20}$ alkenyl or alkenylene, $C_2$-$C_{12}$ alkenyl or alkenylene, or $C_2$-$C_6$ alkenyl or alkenylene. Examples of alkenyl groups include ethenyl (or vinyl), allyl, and but-3-en-1-yl. Included within these terms are cis (E) and trans (Z) isomers, and mixtures thereof. A double bond of an alkenyl or alkenylene group may be represented by the structure "═" or "<." It will be appreciated that a double bond represented by the structure "" may represent an unspecified cis or trans configuration or a mixture of cis and trans configurations. It will be appreciated that an alkenyl or alkenylene can be unsubstituted or substituted as described herein. An alkenyl or alkenylene group can be substituted with any of the substituents in the various embodiments described herein, including one or more of such substituents. For example, an alkenylene group may be substituted by an ester group to provide an alkenylene ester. It will be appreciated that the term "alkenylene diester" refers to an alkenylene substituted by two ester groups. For example, an alkenylene diester can be depicted by the structural formulae

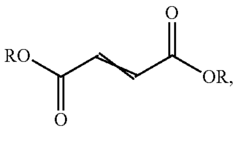,
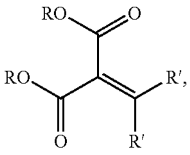,

-continued

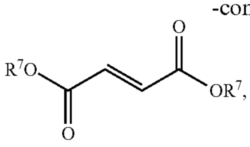
, or
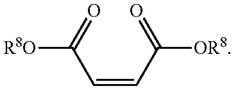

The term "blend" as used herein, refers to a mixture of two or more components. Blends or mixtures can be homogeneous mixtures or heterogeneous mixtures. A homogeneous mixture refers to a composition that is uniform throughout the mixture. A heterogeneous mixture refers to a composition that includes two or more phases. A heterogeneous mixture, for example, includes regions with properties that are distinct from those of another region even if they are in the same state of matter (e.g., liquid or solid).

The term "bio-oil" as used herein, refers to a non-petroleum-based oil, such as a mineral oil, a vegetable oil, or any suitable oil derived from a biological source. A non-limiting example of a bio-oil is castor oil.

The terms "bio-based ester" or "bio-ester," as used herein, refer to a fatty acid ester derived from a bio-oil. For example, an alkyl ricinoleate is a fatty acid ester derived from castor oil, which may include ricinoleic acid.

The term "$C_{x-y}$" or "$C_x$-$C_y$", when used in conjunction with a chemical moiety, such as alkyl, is meant to include groups that contain from x to y carbons in the chain. $C_0$ alkyl indicates a hydrogen where the group is in a terminal position, a bond if internal. A $C_{1-6}$ alkyl group, for example, contains from one to six carbon atoms in the chain.

The term "ester", as used herein, refers to a group, or —C(O)Oalkyl or —C(O)OR$^8$, wherein R$^8$ represents a hydrocarbyl group, preferably an alkyl, and the alkyl may be $C_1$-$C_{15}$ alkyl, $C_2$-$C_{12}$ alkyl, or $C_1$-$C_6$ alkyl.

The terms "flocculant" or "flock", as used herein, refer to a coagulated mass of high melting particles that separate from the liquid phase at ambient temperature. For example, the formation and/or presence of a diol (e.g., a diol present in a bio-ester) in an oil composition may lead to flock formation.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The terms "synthetic-based ester" or "syn-ester," as used herein, refer to an ester that has been chemically synthesized. For example, a dialkyl fumarate and a dialkyl maleate may be syn-esters. A non-limiting example of a commercial synthetic-based ester is Esterex™ A34 (diisononyl adipate) available from ExxonMobil.

The terms "Group II base oil" or "Group II mineral oil," as used herein, refer to a petroleum-derived oil being more than 90 percent saturates, less than 0.03 percent sulfur and with a viscosity index of 80 to 120. A non-limiting example of a group II mineral oil is Chevron Neutral Oil (100R), available from Chevron.

The terms "Group III base oil" or "Group III mineral oil," as used herein, refer to a petroleum-derived oil being more than 90 percent saturates, less than 0.03 percent sulfur and with a viscosity index of greater than 120. A non-limiting example of a group III mineral oil is TS-VHVI 4, available from Tulstar Products, Inc.

Representative Embodiments

In some embodiments, the disclosure relates to an oil composition comprising a blend of an alkenylene diester and a compound of Formula I, (I)

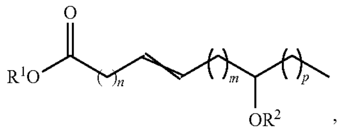
, or salt thereof, wherein

- R$^1$ is alkyl,
- R$^2$ is H or acyl, and
- each of n, m, and p is independently an integer of 1, 2, 3, 4, 5, 6, 7, 8, 9, or 10.

In some embodiments, the disclosure relates to an oil composition comprising a blend of a dialkyl fumarate and an alkyl ricinoleate.

In some embodiments, the disclosure relates to a base oil composition comprising the oil composition as described herein. In some embodiments, the disclosure relates to a base oil composition comprising a blend of an alkenylene diester and a compound of Formula I. In some embodiments, the disclosure relates to a base oil composition comprising a blend of a dialkyl fumarate and an alkyl ricinoleate. In some embodiments, the base oil is an automotive oil (i.e., an automotive base oil). In some embodiments, the base oil is a cooling fluid (e.g., an automotive cooling fluid and/or an immersive cooling fluid).

In some embodiments, the disclosure relates to an automotive oil (i.e., an automotive base oil) comprising the oil composition described herein. In some embodiments, the disclosure relates to an automotive oil (i.e., an automotive base oil) comprising a blend of an alkenylene diester and a compound of Formula I. In some embodiments, the disclosure relates to an automotive oil (i.e., an automotive base oil) comprising a blend of a dialkyl fumarate and an alkyl ricinoleate.

In some embodiments, the disclosure relates to a cooling fluid (e.g., an automotive cooling fluid and/or an immersive cooling fluid) comprising the oil composition described herein. In some embodiments, the disclosure relates to a cooling fluid (e.g., an automotive cooling fluid and/or an immersive cooling fluid) comprising a blend of an alkenylene diester and a compound of Formula I. In some embodiments, the cooling fluid is an immersive cooling fluid. In some embodiments, the cooling fluid is a battery immersive cooling fluid or a data center hardware immersive cooling fluid. In some embodiments, the disclosure relates to a cooling fluid (e.g., an automotive cooling fluid and/or an immersive cooling fluid) comprising a blend of a dialkyl fumarate and an alkyl ricinoleate.

In some embodiments, the disclosure relates to an additive comprising the oil composition described herein. In some embodiments, the disclosure relates to an additive comprising a blend of an alkenylene diester and a compound of Formula I. In some embodiments, the disclosure relates to an additive comprising a blend of a dialkyl fumarate and an alkyl ricinoleate.

In some embodiments, the disclosure relates to an additive for an automotive oil (i.e., an automotive base oil) composition comprising the oil composition described herein. In some embodiments, the disclosure relates to an additive for an automotive base oil composition comprising a blend of an alkenylene diester and a compound of Formula I. In some embodiments, the disclosure relates to an additive for an automotive base oil composition comprising a blend of a dialkyl fumarate and an alkyl ricinoleate. In some embodiments, the disclosure relates to an additive for an automotive oil composition comprising a blend of a dialkyl fumarate and an alkyl ricinoleate.

In some embodiments, the disclosure relates to additive for a cooling fluid (e.g., an automotive cooling fluid and/or an immersive cooling fluid) composition comprising the oil composition described herein. In some embodiments, the disclosure relates to an additive for a cooling fluid (e.g., an automotive cooling fluid and/or an immersive cooling fluid) composition comprising a blend of an alkenylene diester and a compound of Formula I. In some embodiments, the cooling fluid is an immersive cooling fluid. In some embodiments, the cooling fluid (e.g., an immersive cooling fluid) is a battery immersive cooling fluid or a data center hardware immersive cooling fluid. In some embodiments, the disclosure relates to an additive for a cooling fluid (e.g., an automotive cooling fluid and/or an immersive cooling fluid) composition comprising a blend of a dialkyl fumarate and an alkyl ricinoleate. In some embodiments, the disclosure relates to an additive for a cooling fluid (e.g., an automotive cooling fluid and/or an immersive cooling fluid) composition comprising a blend of a dialkyl fumarate and an alkyl ricinoleate.

In some embodiments, the disclosure relates to a method of cooling an electric drive, comprising adding a composition to the electric drive. In some embodiments, the disclosure relates to a method of cooling an electric drive, comprising adding the oil composition described herein to the electric drive. An electric drive (drivetrain), for example, may include one or more components such as a battery, power electronics, electric axle (e-axle), an electric motor, and the like. In some embodiments, the composition added to the electric drive comprises a blend of an alkenylene diester and a compound of Formula I. In some embodiments, the step of adding includes immersing one or more components of the electric drive (e.g., a battery) in the oil composition. In some embodiments, the composition added to the electric drive comprises a blend of a dialkyl fumarate and an alkyl ricinoleate.

In some embodiments, the cooling fluid is an immersive cooling fluid. In some embodiments, the cooling fluid is a battery immersive cooling fluid or a data center hardware immersive cooling fluid.

In some embodiments, the disclosure relates to a method of cooling a data center (e.g., data center hardware), comprising adding a composition to the data center. In some embodiments, the disclosure relates to a method of cooling a data center, comprising adding the oil composition described herein to the data center. In some embodiments, the composition added to the data center comprises a blend of an alkenylene diester and a compound of Formula I. In some embodiments, the step of adding includes immersing one or more components of the data center in the oil composition. In some embodiments, the composition added to the data center comprises a blend of a dialkyl fumarate and an alkyl ricinoleate.

In some embodiments, the disclosure relates to a process of preparing an oil composition blend comprising the oil composition described herein. The oil composition, for example, may be a base oil, such as an automotive oil (e.g., an automotive base oil) and/or a cooling fluid (e.g., an immersive cooling fluid). In some embodiments, the disclosure relates to a process of preparing an oil composition blend comprising a blend of an alkenylene diester and a compound of Formula I. In some embodiments, the disclosure relates to a process of preparing an oil composition blend comprising a blend of a dialkyl fumarate and an alkyl ricinoleate. In some embodiments, the disclosure relates to a process of preparing an automotive oil (i.e., an automotive base oil) composition blend comprising a blend of a dialkyl fumarate and an alkyl ricinoleate.

In some embodiments, the process of preparing an oil composition blend comprises combining an alkenylene diester and a compound of Formula I. In some embodiments, the process of preparing an oil composition blend comprises combining an alkenylene diester and a compound of Formula I, and mixing for at least 5 minutes. In some embodiments, the process of preparing an oil composition blend comprises combining an alkenylene diester and a compound of Formula I to provide a mixture, and mixing the mixture for at least 5 minutes to provide the blend. For example, the mixing may be at least about 10 minutes, at least about 15 minutes, at least about 20 minutes, at least about 25 minutes, or at least about 30 minutes. In some embodiments, the process of preparing an oil composition blend comprises combining an alkenylene diester and a compound of Formula I, mixing for between about 5 minutes and about 1 hour. For example, the mixing may be between about 10 minutes and about 1 hour, about 15 minutes and about 1 hour, about 5 minutes and about 45 minutes, about 10 minutes and about 45 minutes, or about 15 minutes and about 45 minutes.

In some embodiments, the alkenylene diester is a synthetic-based ester (syn-ester). In some embodiments, the compound of Formula I is a bio-based ester (bio-ester). In some embodiments, the disclosure relates to an oil composition comprising a blend of a bio-based ester (bio-ester) and a synthetic-based ester (syn-ester).

In some embodiments, the oil composition comprises a blend of an alkenylene diester including an alkyl fumarate (e.g., a dialkyl fumarate), an alkyl maleate (e.g., a dialkyl maleate), or a combination thereof, and an alkyl ricinoleate. In some embodiments, the oil composition comprises a blend of an alkenylene diester including an alkyl fumarate (e.g., a dialkyl fumarate), an alkyl maleate (e.g., a dialkyl maleate), or a combination thereof, and a compound of Formula I.

In some embodiments, a compound (e.g., a bio-based ester) is of the Formula I:

(I)

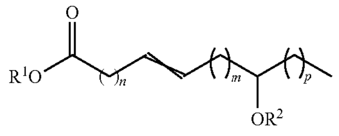

or salt thereof, wherein $R^1$ is alkyl, $R^2$ is H or acyl, each of n, m, and p is independently an integer of 1, 2, 3, 4, 5, 6, 7, 8, 9, or 10.

In some embodiments, n is an integer of 1, 2, 3, 4, 5, 6, 7, 8, 9, or 10. For example, n may be an integer of 2, 3, 4, 5, 6, 7, 8, 9, or 10, n may be an integer of 4, 5, 6, 7, 8, 9, or 10, n may be an integer of 6, 7, 8, 9, or 10, n may be an integer of 2, 3, 4, 5, 6, 7, or 8, n may be an integer of 4, 5, 6, 7, or 8, or n may be an integer of 6, 7, or 8. In certain preferred embodiments, n is 7.

In some embodiments, m is an integer of 1, 2, 3, 4, 5, 6, 7, 8, 9, or 10. For example, m may be an integer of 1, 2, 3, 4, 5, 6, 7, or 8, m may be an integer of 1, 2, 3, 4, 5, or 6, m may be an integer of 1, 2, 3, or 4, or m may be 1 or 2. In certain preferred embodiments, m is 1.

In some embodiments, p is an integer of 1, 2, 3, 4, 5, 6, 7, 8, 9, or 10. For example, p may be an integer of 2, 3, 4, 5, 6, 7, 8, or 9, p may be an integer of 3, 4, 5, 6, 7, or 8, p may be an integer of 3, 4, 5, or 6, p may be an integer of 4, 5, 6, or 7, or p may be an integer of 4, 5, or 6. In certain preferred embodiments, p is 5.

In some embodiments, the compound of Formula I is an alkyl ricinoleate or an alkyl ricinelaidate. In some embodiments, the compound of Formula I is an alkyl ricinoleate. In some embodiments, the alkyl ricinoleate is a $C_1$-$C_6$ alkyl ricinoleate. In some embodiments, the alkyl ricinoleate is a $C_1$-$C_3$ alkyl ricinoleate. In certain preferred embodiments, the alkyl ricinoleate is methyl ricinoleate. In some embodiments, the compound of Formula I is an alkyl ricinelaidate. In some embodiments, the alkyl ricinelaidate is a $C_1$-$C_6$ alkyl ricinelaidate. In some embodiments, the alkyl ricinelaidate is a $C_1$-$C_3$ alkyl ricinelaidate. In some embodiments, the alkyl ricinelaidate is methyl ricinelaidate.

In some embodiments, the compound of Formula I is a methyl ricinoleate (i.e., $R^1$ is methyl) or a methyl ricinelaidate (i.e., $R^1$ is methyl). In some embodiments, the compound of Formula I (e.g., alkyl ricinoleate) is methyl ricinoleate (i.e., $R^1$ is methyl). In some embodiments, the compound of Formula I (e.g., alkyl ricinelaidate) is methyl ricinelaidate (i.e., $R^1$ is methyl).

In some embodiments, the compound of Formula I is of Formula II:

(II)

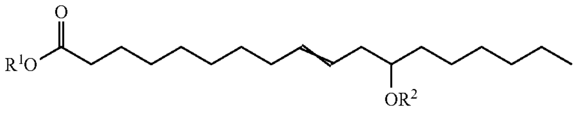

or salt thereof, wherein $R^1$ is alkyl (e.g., $C_1$-$C_6$ alkyl), and $R^2$ is H or acyl (e.g., $C_1$-$C_6$ acyl).

In some embodiments, the compound of Formula I is of Formula IIa:

(IIa)

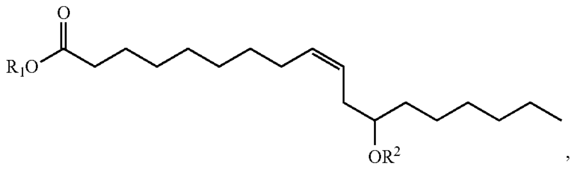

, or salt thereof, wherein $R^1$ is alkyl (e.g., $C_1$-$C_6$ alkyl), and $R^2$ is H or acyl (e.g., $C_1$-$C_6$ acyl).

In some embodiments, the compound of Formula I is of Formula IIb:

(IIb)

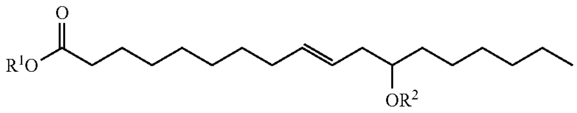

or salt thereof, wherein $R^1$ is alkyl (e.g., $C_1$-$C_6$ alkyl) and $R^2$ is H or acyl (e.g., $C_1$-$C_6$ acyl).

In some embodiments, the compound of Formula I (e.g., a compound of Formula II, IIa, IIb, II-1, IIa-1, or IIb-1) is a mixture of a first compound and a second compound. In some embodiments, the compound of Formula I is a mixture of a first compound of Formula I and a second compound of Formula I. In some embodiments, the compound of Formula I is a mixture of a first compound of Formula IIa (e.g., an alkyl ricinoleate) and a second compound of Formula IIb (e.g., an alkyl ricinelaidate).

In some embodiments, the compound of Formula I is of Formula II-1:

(II-1)

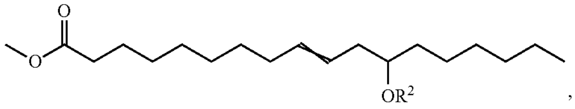

, or salt thereof, wherein $R^2$ is H or acyl (e.g., $C_1$-$C_6$ acyl).

In some embodiments, the compound of Formula I is of Formula IIa-1:

(IIa-1)

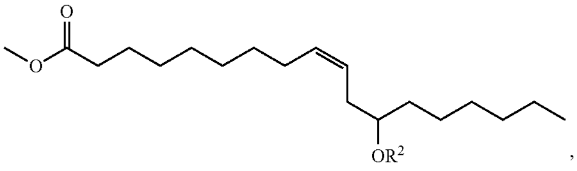

, or salt thereof, wherein $R^2$ is H or acyl (e.g., $C_1$-$C_6$ acyl).

In some embodiments, the compound of Formula I is of Formula IIb-1:

(IIb-1)

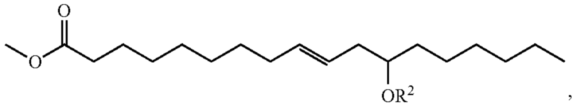

, or salt thereof, wherein $R^2$ is H or acyl (e.g., $C_1$-$C_6$ acyl).

In some embodiments, $R^1$ is alkyl (e.g., $C_1$-$C_6$ alkyl). In some embodiments, $R^1$ is methyl, ethyl, or propyl, and preferably is methyl.

In some embodiments, $R^2$ is H or acyl. In some embodiments, $R^2$ is H. In some embodiments, $R^2$ is H or $C_1$-$C_6$ acyl (e.g., C (O) $C_1$-$C_6$ alkyl). In some embodiments, $R^2$ is H or $C_1$-$C_3$ acyl (e.g., C (O) $C_1$-$C_3$ alkyl). In some embodiments, $R^2$ is H or acetyl. In some embodiments, $R^2$ is a $C_1$-$C_6$ acyl (e.g., C (O) $C_1$-$C_6$ alkyl). In some embodiments, $R^2$ is $C_1$-$C_3$ acyl (e.g., C (O) $C_1$-$C_3$ alkyl). In certain preferred embodiments, $R^2$ is acetyl.

In some embodiments, the compound of Formula I (e.g., a compound of Formula II, IIa, IIb, II-1, IIa-1, or IIb-1) is a compound selected from the group consisting of:

| Bio-Ester | Structure |
|---|---|
| Bio-ester A (B-A) | 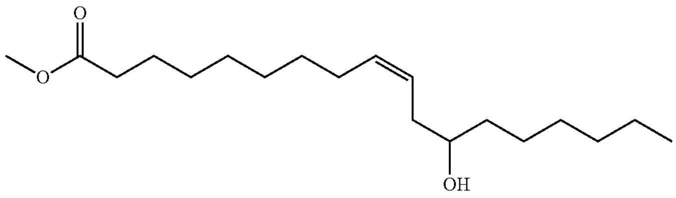 [SMILES: CCCCCCC(O)C/C=C\CCCCCCCC(=O)OC] methyl ricinoleate A |
| Bio-ester B (B-B) | 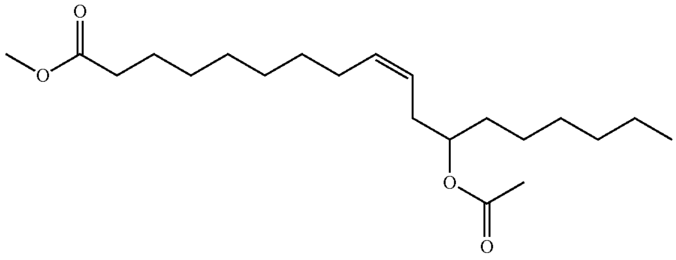 [SMILES: CCCCCCC(C/C=C\CCCCCCCC(=O)OC)OC(C)=O] methyl ricinoleate B |

In some embodiments, a compound of Formula I (e.g., a compound of Formula II, IIa, IIb, II-1, IIa-1, or IIb-1) includes an alcohol that is not protected (i.e., $R^2$ is H), or an alcohol that is protected (i.e., $R^2$ is not H, such as acyl). For example, the protected alcohol may be esterified (i.e., acylated) to form an acyl-protected alcohol (i.e., an alkyl ester). In some embodiments, it may be advantageous to protect the alcohol group in a compound of Formula I (e.g., a compound of Formula II, IIa, IIb, II-1, IIa-1, or IIb-1) to improve the shelf life of the oil composition. For example, a compound of Formula I (e.g., a compound of Formula II, IIa, IIb, II-1, IIa-1, or IIb-1) including a protected alcohol (i.e., $R^2$ of acyl, such as acetyl) may improve the stability of the compound of Formula I (e.g., a compound of Formula II, IIa, IIb, II-1, IIa-1, or IIb-1) in the oil composition, and/or minimize or prevent flock formation in the oil composition.

In some embodiments, a compound of Formula I (e.g., a compound of Formula II, IIa, IIb, II-1, IIa-1, or IIb-1) is a type of fatty acid ester synthesized from castor oil and an alkyl alcohol. For example, methyl ricinoleate is a type of fatty acid methyl ester synthesized from castor oil and methyl alcohol.

In some embodiments, the alkenylene diester is an alkyl fumarate (e.g., a dialkyl fumarate), an alkyl maleate (e.g., a dialkyl maleate), or a combination thereof. In some embodiments, the alkenylene diester is a combination of one or more of an alkyl fumarate (e.g., a dialkyl fumarate), one or more of an alkyl maleate (e.g., a dialkyl maleate), or combinations thereof. In some embodiments, the alkenylene diester is a combination of a first alkenylene diester (e.g., a dialkyl fumarate or a dialkyl maleate) and a second alkenylene diester (e.g., a dialkyl fumarate or a dialkyl maleate). In some embodiments, the alkenylene diester is a combination of a dialkyl fumarate and a dialkyl maleate. In some embodiments, the alkenylene diester is a combination of a first dialkyl maleate (e.g., dioctyl maleate) and a second dialkyl maleate (e.g., dibutyl maleate). In some embodiments, the alkenylene diester is a combination of a first dialkyl fumarate (e.g., dioctyl fumarate) and a second dialkyl fumarate (e.g., dibutyl fumarate).

In some embodiments, a synthetic-based ester (e.g., an alkenylene diester) is of Formula III:

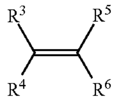

(III)

wherein each of $R^3$, $R^4$, $R^5$, and $R^6$ is independently H or ester, provided that:

one of $R^3$ and $R^4$ is H and the other of $R^3$ and $R^4$ is ester, and one of $R^5$ and $R^6$ is H and the other of $R^5$ and $R^6$ is ester.

In some embodiments, each of $R^3$ and $R^5$ is H, and each of $R^4$ and $R^6$ is ester (e.g., —C(O)Oalkyl). In some embodiments, each of $R^3$ and $R^6$ is H, and each of $R^4$ and $R^5$ is ester. In some embodiments, $R^3$ is the same as $R^5$, and $R^4$ is the same as $R^6$. In some embodiments, $R^3$ is the same as $R^6$, and $R^4$ is the same as $R^5$.

In some embodiments, each of $R^3$ and $R^5$ is H. In some embodiments, each of $R^4$ and $R^6$ is ester (e.g., —C(O)Oalkyl). In some embodiments, each of $R^4$ and $R^6$ is —C(O)O$C_2$-$C_{12}$ alkyl. For example, each of $R^4$ and $R^6$ may be —C(O)O$C_4$-$C_8$ alkyl, —C(O)O$C_6$-$C_{12}$ alkyl, or —C(O)O$C_2$-$C_6$ alkyl. In some embodiments, each of $R^4$ and $R^6$ is —C(O)O$C_4$ alkyl. In some embodiments, each of $R^4$ and $R^6$ is —C(O)O$C_8$ alkyl.

In some embodiments, each of $R^3$ and $R^6$ is H. In some embodiments, each of $R^4$ and $R^5$ is ester (e.g., —C(O)

Oalkyl). In some embodiments, each of $R^4$ and $R^5$ is —C(O)$OC_2$-$C_{12}$ alkyl. For example, each of $R^4$ and $R^5$ may be —C(O)$OC_4$-$C_5$ alkyl, —C(O)$OC_6$-$C_{12}$ alkyl, or —C(O)$OC_2$-$C_6$ alkyl. In some embodiments, each of $R^4$ and $R^5$ is —C(O)$OC_4$ alkyl. In some embodiments, each of $R^4$ and $R^5$ is —C(O)$OC_8$ alkyl.

In some embodiments, an alkenylene diester is of Formula IV:

(IV)

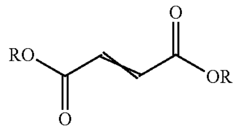

wherein each R is alkyl (e.g., $C_2$-$C_{12}$ alkyl).

In some embodiments, each R is a straight (i.e., linear) chain alkyl or a branched alkyl, and preferably is a straight chain alkyl. In some embodiments, each R is $C_2$-$C_{12}$ alkyl. For example, each R may be $C_4$-$C_8$ alkyl, $C_6$-$C_{12}$ alkyl, or $C_2$-$C_6$ alkyl. In some embodiments, each R is butyl ($C_4$). In some embodiments, each R is octyl ($C_8$).

In some embodiments, an alkenylene diester is a dialkyl fumarate. In some embodiments, the alkenylene diester is of Formula IVa:

(IVa)

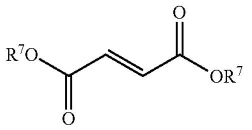

wherein each $R^7$ is alkyl (e.g., $C_2$-$C_{12}$ alkyl).

In some embodiments, each $R^7$ is a straight (i.e., linear) chain alkyl or a branched alkyl, and preferably is a straight chain alkyl. In some embodiments, each $R^7$ is $C_2$-$C_{12}$ alkyl. For example, each $R^7$ may be $C_4$-$C_8$ alkyl, $C_6$-$C_{12}$ alkyl, or $C_2$-$C_6$ alkyl. In some embodiments, $R^7$ is butyl ($C_4$). In some embodiments, each $R^7$ is octyl ($C_8$).

In some embodiments, a dialkyl fumarate is a di ($C_2$-$C_{12}$ alkyl) fumarate. In some embodiments, a dialkyl fumarate is a di ($C_4$-$C_8$ alkyl) fumarate. In some embodiments, the dialkyl fumarate is a di ($C_6$-$C_{12}$ alkyl) fumarate. In some embodiments, a dialkyl fumarate is a di ($C_2$-$C_6$ alkyl) fumarate. In some embodiments, each alkyl chain in the dialkyl fumarate is the same. In some embodiments, each alkyl chain in the dialkyl fumarate is $C_8$ alkyl. In some embodiments, each alkyl chain in the dialkyl fumarate is $C_6$ alkyl. In some embodiments, each alkyl chain in the dialkyl fumarate is $C_4$ alkyl. In some embodiments, each alkyl chain in the dialkyl fumarate is independently a branched chain or a linear chain. In certain preferred embodiments, each alkyl chain in the dialkyl fumarate is a linear chain.

In some embodiments, the dialkyl fumarate is:

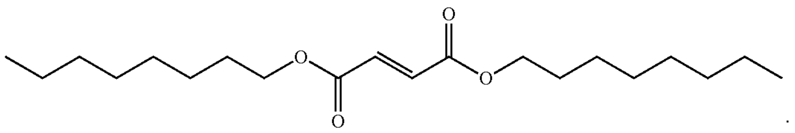 [SMILES: CCCCCCCCOC(=O)/C=C/C(=O)OCCCCCCCC]

In some embodiments, the dialkyl fumarate is:

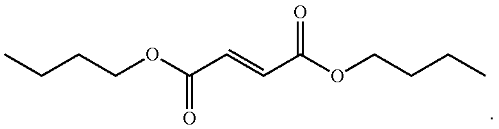 [SMILES: CCCCOC(=O)/C=C/C(=O)OCCCC]

In some embodiments, an alkenylene diester is a dialkyl maleate. In some embodiments, the alkenylene diester is of Formula IVb:

(IVb)

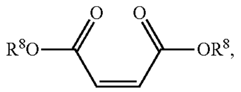

wherein each $R^8$ is alkyl (e.g., $C_2$-$C_{12}$ alkyl).

In some embodiments, each $R^8$ is a straight (i.e., linear) chain alkyl or a branched alkyl, preferably a straight chain alkyl. In some embodiments, each $R^8$ is $C_2$-$C_{12}$ alkyl. For example, each $R^8$ may be $C_4$-$C_8$ alkyl, $C_6$-$C_{12}$ alkyl, or $C_2$-$C_6$ alkyl. In some embodiments, $R^8$ is butyl ($C_4$). In some embodiments, each $R^8$ is octyl ($C_8$).

In some embodiments, a dialkyl maleate is a di ($C_2$-$C_{12}$ alkyl) maleate. In some embodiments, a dialkyl maleate is a di ($C_4$-$C_8$ alkyl) maleate. In some embodiments, the dialkyl maleate is a di ($C_6$-$C_{12}$ alkyl) maleate. In some embodiments, a dialkyl maleate is a di ($C_2$-$C_6$ alkyl) maleate. In some embodiments, each alkyl chain in the dialkyl maleate is the same. In some embodiments, each alkyl chain in the maleate fumarate is $C_8$ alkyl. In some embodiments, each alkyl chain in the dialkyl maleate is $C_6$ alkyl. In some embodiments, each alkyl chain in the dialkyl maleate is $C_4$ alkyl. In some embodiments, each alkyl chain in the dialkyl maleate is independently a branched chain or a linear chain. In certain preferred embodiments, each alkyl chain in the dialkyl maleate is a linear chain.

In some embodiments, the dialkyl maleate is:

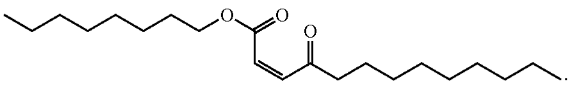 [SMILES: CCCCCCCCCC(=O)/C=C\C(=O)OCCCCCCCC]

In some embodiments, the dialkyl maleate is:

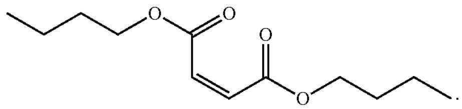 [SMILES: CCCCOC(=O)/C=C\C(=O)OCCCC]

In some embodiments, the alkenylene diester is selected from the group consisting of:

| Syn-Ester | Structure |
|---|---|
| A | 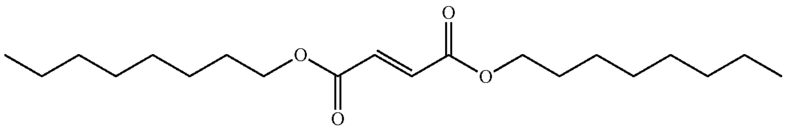 [SMILES: CCCCCCCCOC(=O)/C=C/C(=O)OCCCCCCCC]<br>dioctyl fumarate (DOF) |
| B | 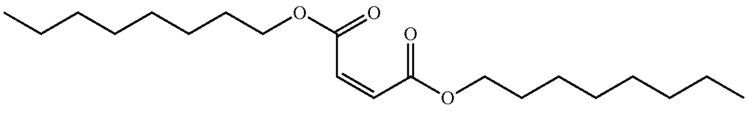 [SMILES: CCCCCCCCOC(=O)/C=C\C(=O)OCCCCCCCC]<br>dioctyl maleate (DOM) |
| C | 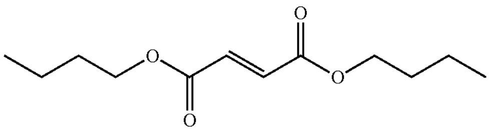 [SMILES: CCCCOC(=O)/C=C/C(=O)OCCCC]<br>dibutyl fumarate (DBF) |
| D | 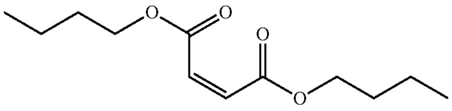 [SMILES: CCCCOC(=O)/C=C\C(=O)OCCCC]<br>dibutyl maleate (DBM) |

In some embodiments, a dialkyl fumarate can be produced by the reaction of fumaric acid with two equivalents of an alkyl alcohol. For example, dioctyl fumarate can be produced by the reaction of fumaric acid with two equivalents of octanol. An acidic catalyst can be used and the byproduct is water. Fumaric acid can be produced by the isomerization of maleic anhydride, or by fermentation of glucose.

In some embodiments, a dialkyl maleate can be produced by the reaction of maleic anhydride with two equivalents of an alkyl alcohol. For example, dioctyl maleate can be produced by the reaction of maleic anhydride with two equivalents of octanol. An acidic catalyst can be used and the byproduct is water.

In some embodiments, the alkenylene diester and the compound of Formula I are present in a ratio of about 10:1 to about 1:10 in the composition. For example, the alkenylene diester and the compound of Formula I may be present in a ratio of about 9:1 to about 1:9, about 8:1 to about 1:8, about 7:1 to about 1:7, about 6:1 to about 1:6, about 5:1 to about 1:5, about 4:1 to about 1:4, about 3:1 to about 1:3, or about 2:1 to about 1:2 in the composition. In some embodiments, the alkenylene diester and the compound of Formula I are present at about a 3:1 ratio in the composition. In some embodiments, the alkenylene diester and the compound of Formula I are present at about a 1:1 ratio in the composition. In some embodiments, the oil composition consists of the alkylene diester and the compound of Formula I at about a 3:1 ratio. In some embodiments, the oil composition consists of the alkylene diester and the compound of Formula I at about a 1:1 ratio.

In some embodiments, the oil composition comprises a compound of Formula I, a first alkenylene diester (e.g., dioctyl maleate) and a second alkylene diester (e.g., dibutyl maleate), and the first alkenylene diester and the second alkenylene diester are present in a ratio of about 20:1 to about 1:1. For example, the first alkenylene diester and the second alkylene diester may be present in a ratio of about 15:1 to about 1:1, about 12:1 to about 1:1, about 10:1 to about 1:1, about 9:1 to about 1:1, about 8:1 to about 1:1, about 7:1 to about 1:1, about 6:1 to about 1:1, about 5:1 to about 1:1, about 4:1 to about 1:1, about 15:1 to about 4:1, about 12:1 to about 4:1, or about 10:1 to about 4:1 in an oil composition comprising the first alkenylene diester, the second alkylene diester, and a compound of Formula I. In some embodiments, the first alkenylene diester and the second alkylene diester are present in a ratio of about 6.5:1 in an oil composition comprising the first alkenylene diester, the second alkylene diester, and a compound of Formula I.

In some embodiments, the dialkyl fumarate and the alkyl ricinoleate are present in a ratio of about 10:1 to about 1:10 in the composition. In some embodiments, the dialkyl fumarate and the alkyl ricinoleate are present in a ratio of about 5:1 to about 1:5 in the composition. In some embodiments, the dialkyl fumarate and the alkyl ricinoleate are present in a ratio of about 4:1 to about 1:4 in the composition. In some embodiments, the dialkyl fumarate and the alkyl ricinoleate are present in a ratio of about 3:1 to about 1:3 in the composition. In some embodiments, the dialkyl fumarate and the alkyl ricinoleate are present in a ratio of about 2:1 to about 1:2 in the composition. In some embodiments, the dialkyl fumarate and the alkyl ricinoleate are present at about a 1:1 ratio in the composition.

In some embodiments, the dialkyl maleate and the alkyl ricinoleate are present in a ratio of about 10:1 to about 1:10 in the composition. In some embodiments, the dialkyl maleate and the alkyl ricinoleate are present in a ratio of about 5:1 to about 1:5 in the composition. In some embodiments, the dialkyl maleate and the alkyl ricinoleate are present in a ratio of about 4:1 to about 1:4 in the composition. In some embodiments, the dialkyl maleate and the alkyl ricinoleate are present in a ratio of about 3:1 to about 1:3 in the composition. In some embodiments, the dialkyl maleate and the alkyl ricinoleate are present in a ratio of about 2:1 to about 1:2 in the composition. In some embodiments, the dialkyl maleate and the alkyl ricinoleate are present at about a 1:1 ratio in the composition.

In some embodiments, a first alkenylene diester (e.g., dioctyl maleate), a second alkylene diester (e.g., dibutyl maleate), and a compound of Formula I are present in a ratio of about 2:1:1 to about 10:1:5 in the composition. In some embodiments, a first alkenylene diester (e.g., dioctyl maleate), a second alkylene diester (e.g., dibutyl maleate), and a compound of Formula I are present in a ratio of about 6.5:1:2.5 in the composition.

In some embodiments, oil compositions as described herein (e.g., bio-based esters and blends) show excellent thermal conductivity, which is a key parameter for high cooling efficiency. Binary mixtures have high flash point and high oxidation stability, which are critical requirements for use as lubricant base oils and cooling fluid demonstrating high dielectric properties.

In some embodiments, low viscosity of oil compositions as described herein (e.g., ester blends) deliver high thermal conductivity values suitable for cooling. The natural corrosion inhibition and lubricity of esters may mean that some other additives can be reduced in terms of dosed amount. In some embodiments, the oil compositions described herein may comprise advantageous properties, such as better thermal properties and higher efficiency (e.g., longer battery life, better fuel efficiency). In some embodiments, it may be advantageous for the oil compositions described herein to achieve improved thermal properties and higher efficiency through low viscosity of ester blends (e.g., blends of bio-based esters and synthetic-based esters).

In some embodiments, the oil composition as described herein has a flash point of greater than about 140° C. For example, the oil compositions may have a flash point of greater than about 145° C., greater than about 150° C., greater than about 155° C., greater than about 160° C., greater than about 165° C., greater than about 170° C., greater than about 175° C., greater than about 180° C., greater than about 185° C., or greater than about 190° C. In some embodiments, the oil composition has a flash point of about 140° C. to about 200° C. For example, the oil compositions may have a flash point of about 145° C. to about 200° C., about 150° C. to about 200° C., about 155° C. to about 200° C., about 160° C. to about 200° C., about 165° C. to about 200° C., about 170° C. to about 200° C., about 175° C. to about 200° C., about 180° C. to about 200° C., about 185° C. to about 200° C., or about 190° C. to about 200° C. It will be appreciated that the flash point of the oil composition can be measured using the ASTM D93 test standard.

In some embodiments, the oil composition as described herein has a viscosity (KV100) of less than about 3 cSt. For example, the oil compositions may have a viscosity (KV100) of less than about 2.9 cSt, less than about 2.8 cSt, less than about 2.7 cSt, less than about 2.6 cSt, less than about 2.5 cSt, less than about 2.4 cSt, less than about 2.3 cSt, less than about 2.2 cSt, less than about 2.1 cSt, or less than about 2.0 cSt. In some embodiments, the oil composition has a viscosity (KV100) of about 0.9 cSt to about 3.0 cSt. For example, the oil compositions may have a viscosity (KV100) of about 0.9 cSt to about 2.9 cSt, about 0.9 cSt to about 2.8 cSt, about 0.9 cSt to about 2.7 cSt, about 0.9 cSt to about 2.6 cSt, about 0.9 cSt to about 2.5 cSt, about 0.9 cSt to about 2.4 cSt, about 0.9 cSt to about 2.3 cSt, about 0.9 cSt to about 2.2 cSt, about 0.9 cSt to about 2.1 cSt, or about 0.9 cSt to about 2.0 cSt. It will be appreciated that the viscosity of the oil composition can be measured using the ASTM D445 test standard.

In some embodiments, the oil composition as described herein has a viscosity (KV40) of less than about 15 cSt. For example, the oil compositions may have a viscosity (KV40) of less than about 14 cSt, less than about 13 cSt, less than about 12 cSt, less than about 11 cSt, less than about 10 cSt, less than about 9 cSt, less than about 8 cSt, less than about 7 cSt, less than about 6 cSt, or less than about 5 cSt. In some embodiments, the oil composition has a viscosity (KV40) of less than about 10.0 cSt, less than about 9.9 cSt, less than about 9.8 cSt, less than about 9.7 cSt, less than about 9.6 cSt, less than about 9.5 cSt, less than about 9.4 cSt, less than about 9.3 cSt, less than about 9.2 cSt, less than about 9.1 cSt, less than about 9.0 cSt, less than about 8.9 cSt, less than about 8.8 cSt, less than about 8.7 cSt, less than about 8.6 cSt, less than about 8.5 cSt, less than about 8.4 cSt, less than about 8.3 cSt, less than about 8.2 cSt, less than about 8.1 cSt, or less than about 8.0 cSt. In some embodiments, the oil composition has a viscosity (KV40) of about 3 cSt to about 15 cSt. For example, the oil compositions may have a viscosity (KV40) of about 3 cSt to about 14 cSt, about 3 cSt to about 13 cSt, about 3 cSt to about 12 cSt, about 3 cSt to about 11 cSt, about 3 cSt to about 10 cSt, about 5 cSt to about 15 cSt, about 5 cSt to about 14 cSt, about 5 cSt to about 13 cSt, about 5 cSt to about 12 cSt, about 5 cSt to about 11 cSt, or about 5 cSt to about 10 cSt. It will be appreciated that the viscosity of the oil composition can be measured using the ASTM D445 test standard.

In some embodiments, the oil composition as described herein has an electrical conductivity of less than about 100 nS/m. For example, the oil compositions may have an electrical conductivity of less than about 90 nS/m, less than about 80 nS/m, less than about 70 nS/m, less than about 60 nS/m, less than about 50 nS/m, less than about 40 nS/m, or less than about 30 nS/m. It will be appreciated that the electrical conductivity of the oil composition can be measured using the DIN EN 51 111 test standard.

In some embodiments, the oil composition as described herein has an electrical conductivity of less than about 100 nS/m when measured over a range of about 20° C. to about 150° C. For example, the oil compositions may have an electrical conductivity of less than about 90 nS/m, less than about 80 nS/m, less than about 75 nS/m, less than about 70 nS/m, less than about 60 nS/m, less than about 50 nS/m, less than about 40 nS/m, less than about 30 nS/m, less than about 25 nS/m, less than about 20 nS/m, or less than about 15 nS/m when measured over a range of about 20° C. to about 150° C. In some embodiments, the oil composition has an electrical conductivity of less than about 25 nS/m when measured over a range of about 20° C. to about 150° C.

In some embodiments, the oil composition as described herein has an electrical conductivity of less than about 40 nS/m when measured over a range of about 20° C. to about 150° C. For example, the oil composition may have an electrical conductivity of less than about 25 nS/m when measured over a range of about 20° C. to about 140° C., about 20° C. to about 120° C., about 20° C. to about 120° C., about 20° C. to about 110° C., or about 20° C. to about 100° C.

In some embodiments, the oil composition as described herein has an electrical conductivity of less than about 25 nS/m when measured over a range of about 20° C. to about 150° C. For example, the oil composition may have an electrical conductivity of less than about 25 nS/m when measured over a range of about 20° C. to about 140° C., about 20° C. to about 120° C., about 20° C. to about 120° C., about 20° C. to about 110° C., or about 20° C. to about 100° C.

In some embodiments, the oil composition as described herein has an electrical conductivity of less than about 40 nS/m when measured at a temperature of about 30° C. In some embodiments, the oil composition as described herein has an electrical conductivity of less than about 25 nS/m when measured at a temperature of about 30° C. For example, the oil compositions may have an electrical conductivity of less than about 25 nS/m, less than about 25 nS/m, less than about 20 nS/m, less than about 15 nS/m, or less than about 10 nS/m when measured at a temperature of about 30° C.

In some embodiments, the oil composition as described herein has an electrical conductivity of about 0.1 nS/m to about 100 nS/m when measured over a range of about 20° C. to about 150° C. For example, the oil composition may have an electrical conductivity of about 0.1 nS/m to about 80 nS/m, about 0.1 nS/m to about 75 nS/m, about 0.1 nS/m to about 70 nS/m, about 0.1 nS/m to about 60 nS/m, about 0.1 nS/m to about 50 nS/m, about 0.1 nS/m to about 40 nS/m, about 0.1 nS/m to about 30 nS/m, about 0.1 nS/m to about 25 nS/m, about 0.1 nS/m to about 20 nS/m, or about 0.1 nS/m to about 15 nS/m when measured over a range of about 20° C. to about 150° C.

In some embodiments, the oil composition as described herein has a thermal conductivity of greater than about 120 mW/(m*K) when measured over a range of about 20° C. to about 150° C. For example, the oil composition may have a thermal conductivity of greater than about 120 mW/(m*K), greater than about 130 mW/(m*K), greater than about 140 mW/(m*K), or greater than about 150 mW/(m*K) when measured over a range of about 20° C. to about 150° C. It will be appreciated that the thermal conductivity of the oil composition can be measured using the ASTM D7896-19 test standard.

In some embodiments, the oil composition as described herein has a thermal conductivity of about 120 mW/(m*K) to about 200 mW/(m*K) when measured over a range of about 20° C. to about 150° C. For example, the oil composition may have a thermal conductivity of about 130 mW/(m*K) to about 200 mW/(m*K), about 140 mW/(m*K) to about 200 mW/(m*K), about 150 mW/(m*K) to about 200 mW/(m*K), about 140 mW/(m*K) to about 190 mW/(m*K), about 140 mW/(m*K) to about 180 mW/(m*K), about 140 mW/(m*K) to about 170 mW/(m*K), about 140 mW/(m*K) to about 160 mW/(m*K), or about 140 mW/(m*K) to about 150 mW/(m*K) when measured over a range of about 20° C. to about 150° C.

In some embodiments, the oil composition as described herein has a thermal conductivity of about 120 mW/(m*K) to about 200 mW/(m*K) when measured at a temperature of about 30° C. For example, the oil composition may have a thermal conductivity of about 130 mW/(m*K) to about 200 mW/(m*K), about 140 mW/(m*K) to about 200 mW/(m*K), about 150 mW/(m*K) to about 200 mW/(m*K), about 140 mW/(m*K) to about 190 mW/(m*K), about 140 mW/(m*K) to about 180 mW/(m*K), about 140 mW/(m*K) to about 170 mW/(m*K), about 140 mW/(m*K) to about 160 mW/(m*K), or about 140 mW/(m*K) to about 150 mW/(m*K) when measured at a temperature of about 30° C.

In some embodiments, the oil composition as described herein has a thermal conductivity of greater than about 120 mW/(m*K) when measured over a range of about 20° C. to about 150° C. For example, the oil composition may have a thermal conductivity of greater than about 120 mW/(m*K), greater than about 130 mW/(m*K), greater than about 140 mW/(m*K), or greater than about 150 mW/(m*K) when measured over a range of about 20° C. to about 150° C.

In some embodiments, the oil composition as described herein has a thermal conductivity of greater than about 120 mW/(m*K) when measured at a temperature of about 30° C. For example, the oil composition may have a thermal conductivity of greater than about 120 mW/(m*K), greater than about 130 mW/(m*K), greater than about 140 mW/(m*K), or greater than about 150 mW/(m*K) when measured at a temperature of about 30° C.

In some embodiments, the oil composition as described herein has a specific gravity of less than about 1.00. For example, the oil compositions may have a specific gravity of less than about 0.99, less than about 0.98, less than about 0.97, less than about 0.96, less than about 0.95, less than about 0.94, less than about 0.93, less than about 0.92, less than about 0.91, or less than about 0.90. In some embodiments, the oil composition has a specific gravity of about 0.80 to about 1.00. For example, the oil compositions may have a specific gravity of about 0.85 to about 1.00, about 0.90 to about 1.00, about 0.85 to about 0.99, about 0.85 to about 0.98, about 0.85 to about 0.97, about 0.85 to about 0.96, about 0.85 to about 0.95, about 0.85 to about 0.94, about 0.85 to about 0.93, about 0.85 to about 0.92, about 0.85 to about 0.91, about 0.85 to about 0.90, about 0.90 to about 0.99, about 0.90 to about 0.98, about 0.90 to about 0.97, about 0.90 to about 0.96, about 0.90 to about 0.95, about 0.90 to about 0.94, about 0.90 to about 0.93, about 0.90 to about 0.92, or about 0.90 to about 0.91. It will be appreciated that the specific gravity of the oil composition can be measured using the ASTM D891B test standard, for example, using a Pycnometer.

In some embodiments, the oil composition as described herein provides an average wear scar diameter (WSD) of less than about 400 μm. For example, the oil compositions may provide a WSD of less than about 375 μm, less than about 350 μm, less than about 325 μm, less than about 300 μm, less than about 290 μm, less than about 280 μm, less than about 270 μm, less than about 260 μm, less than about 250 μm, less than about 240 μm, less than about 230 μm, less than about 220 μm, less than about 210 μm, or less than about 200 μm. In some embodiments, the oil composition provides an average wear scar diameter (WSD) of about 100 μm to about 500 μm. For example, the oil compositions may provide a WSD of about 100 μm to about 400 μm, about 100 μm to about 375 μm, about 100 μm to about 350 μm, about 100 μm to about 325 μm, about 100 μm to about 300 μm, about 100 μm to about 290 μm, about 100 μm to about 280 μm, about 100 μm to about 270 μm, about 100 μm to about 260 μm, about 100 μm to about 250 μm, about 200 μm to about 400 μm, about 1200 μm to about 375 μm, about 200 μm to about 350 μm, about 200 μm to about 325 μm, or about 200 μm to about 300 μm. It will be appreciated that the average wear scar diameter (WSD) of the oil composition can be measured using the ASTM D6079 test standard, or a modified version thereof.

In some embodiments, the oil composition as described herein provides an average coefficient of friction (COF) of less than about 0.25. For example, the oil compositions may provide a COF of less than about 0.24, less than about 0.23, less than about 0.22, less than about 0.21, less than about 0.20, less than about 0.19, less than about 0.18, less than about 0.17, less than about 0.16, less than about 0.15, less than about 0.14, less than about 0.13, less than about 0.12, less than about 0.11, or less than about 0.10. In some embodiments, the oil composition provides a COF of about 0.10 to about 0.25. For example, the oil compositions may provide a COF of about 0.10 to about 0.24, about 0.10 to about 0.23, about 0.10 to about 0.22, about 0.10 to about 0.21, about 0.10 to about 0.20, about 0.10 to about 0.19, about 0.10 to about 0.18, about 0.10 to about 0.17, about 0.10 to about 0.16, about 0.10 to about 0.15, about 0.10 to about 0.14, about 0.10 to about 0.13, about 0.10 to about 0.12, or about 0.10 to about 0.11.

In some embodiments, the oil composition as described herein is soluble in a grade II mineral oil (Gr II MO). In some embodiments, the oil composition as described herein is soluble in a grade III mineral oil (Gr III MO).

In some embodiments, the oil composition as described herein is bio-degradable. For example, the bio-degradability of the oil composition may be based on the percentage of a compound of Formula I in the composition. In some embodiments, the oil composition as described herein is at least about 25% bio-degradable. For example, the oil compositions may be at least about 30%, at least about 40%, at least about 50%, least about 55%, at least about 60%, least about 65%, at least about 70%, or at least about 75% biodegradable.

Additional embodiments, features, and advantages of the disclosure will be apparent from the following detailed description and through practice of the disclosure. The compounds of the present disclosure can be described as embodiments in any of the following enumerated embodiments. It will be understood that any of the embodiments described herein can be used in connection with any other embodiments described herein to the extent that the embodiments do not contradict one another.

1. An oil composition comprising a blend of (i) a dialkyl fumarate and (ii) an alkyl ricinoleate.

2. The oil composition of embodiment 1, wherein the dialkyl fumarate and the alkyl ricinoleate are present at about a 1:1 ratio in the composition.

3. The oil composition of any one of embodiments 1-2, wherein the dialkyl fumarate is a di ($C_6$-$C_{12}$ alkyl) fumarate.

4. The oil composition of any one of embodiments 1-3, wherein each alkyl chain in the dialkyl fumarate is $C_8$ alkyl.

5. The oil composition of any one of embodiments 1-4, wherein each alkyl chain in the dialkyl fumarate is a linear chain.

6. The oil composition of any one of embodiments 1-5, wherein the dialkyl fumarate is:

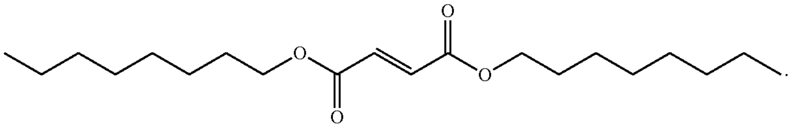 [SMILES: CCCCCCCCOC(=O)/C=C/C(=O)OCCCCCCCC]

7. The oil composition of any one of embodiments 1-6, wherein the alkyl ricinoleate is a $C_1$-$C_3$ alkyl ricinoleate.

8. The oil composition of any one of embodiments 1-7, wherein the alkyl ricinoleate is methyl ricinoleate.

9. A base oil composition comprising the oil composition of any one of embodiments 1-8.

10. An automotive oil comprising the oil composition of any one of embodiments 1-8.

11. An automotive cooling fluid comprising the oil composition of any one of embodiments 1-8.

12. An additive for an automotive base oil composition comprising the oil composition of any one of embodiments 1-8.

13. An additive for an automotive oil composition comprising the oil composition of any one of embodiments 1-8.

14. An additive for an automotive cooling fluid composition comprising the oil composition of any one of embodiments 1-8.

15. A method of cooling an electric drive, comprising adding a composition to the electric drive, wherein the composition comprises the oil composition of any one of embodiments 1-8.

16. A process of preparing an oil composition blend comprising the composition according to any one of embodiments 1-8, comprises combining the (i) a dialkyl fumarate and (ii) an alkyl ricinoleate and mixing for at least 5 minutes.

Additional embodiments, features, and advantages of the disclosure will be apparent from the following detailed description and through practice of the disclosure. The compounds of the present disclosure can be described as embodiments in any of the following enumerated clauses. It will be understood that any of the clauses described herein can be used in connection with any other clauses described herein to the extent that the clauses do not contradict one another.

1. An oil composition comprising a blend of (i) an alkenylene diester and (ii) a compound of Formula I, (I)

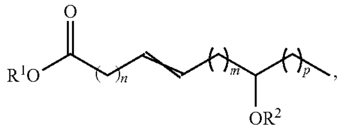

or salt thereof, wherein $R^1$ is alkyl (e.g., $C_1$-$C_6$ alkyl), $R^2$ is H or acyl (e.g., $C_1$-$C_6$ acyl), and each of n, m, and p is independently an integer of 1, 2, 3, 4, 5, 6, 7, 8, 9, or 10.

2. The oil composition of clause 1, wherein the compound of Formula I is an alkyl ricinoleate.

3. An oil composition comprising a blend of (i) a dialkyl fumarate and (ii) an alkyl ricinoleate.

4. The oil composition of clause 2 or 3, wherein the alkyl ricinoleate is methyl ricinoleate.

5. The oil composition of clause 2 or 3, wherein the alkyl ricinoleate is of Formula IIa:

(IIa)

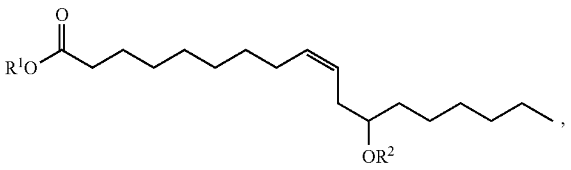

or salt thereof, wherein $R^1$ is alkyl (e.g., $C_1$-$C_6$ alkyl), and $R^2$ is H or acyl (e.g., $C_1$-$C_6$ acyl).

13. The oil composition of clause 12, wherein each $R^7$ is $C_4$-$C_8$ alkyl (e.g., butyl, pentyl, hexyl, heptyl, or octyl).

14. The oil composition of any one of the preceding clauses, wherein the alkenylene diester (e.g., dialkyl fumarate) is dioctyl fumarate (DOF), dibutyl fumarate (DBF), or a combination thereof.

15. The oil composition of any one of the preceding clauses, wherein the alkenylene diester (e.g., dialkyl fumarate) is:

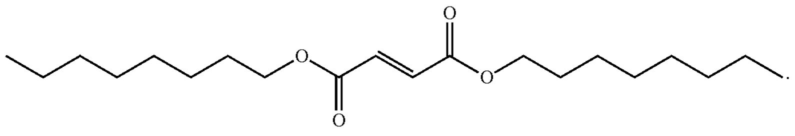 [SMILES: CCCCCCCCOC(=O)/C=C/C(=O)OCCCCCCCC]

6. The oil composition of any one of clauses 1, 2, 4 or 5, wherein $R^2$ is H or acetyl.

7. The oil composition of any one of clauses 1, 2, or 4-6, wherein $R^2$ is H.

8. The oil composition of any one of clauses 1, 2, or 4-6, wherein $R^2$ is acetyl.

9. The oil composition of any one of clauses 1, 2, or 4-8, wherein the alkenylene diester is of Formula III:

(III)

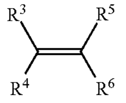

wherein each of $R^3$, $R^4$, $R^5$, and $R^6$ is independently H or ester (e.g., —C(O)Oalkyl), provided that:

one of $R^3$ and $R^4$ is H and the other of $R^3$ and $R^4$ is ester, and one of $R^5$ and $R^6$ is H and the other of $R^5$ and $R^6$ is ester.

10. The oil composition of any one of clauses 1, 2, or 4-9, wherein the alkenylene diester is a dialkyl fumarate, a dialkyl maleate, or a combination thereof.

11. The oil composition of any one of clauses 1, 2, or 4-10, wherein the alkenylene diester is a dialkyl fumarate.

12. The oil composition of any one of the preceding clauses, wherein the alkenylene diester (e.g., dialkyl fumarate) is of Formula (IVa):

(IVa)

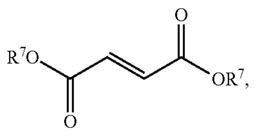

wherein each $R^7$ is alkyl (e.g., $C_2$-$C_{12}$ alkyl).

16. The oil composition of any one of clauses 1, 2, or 4-10, wherein the alkenylene diester is a dialkyl maleate.

17. The oil composition of any one of clauses 1, 2, 4-10 or 16, wherein the alkenylene diester (e.g., dialkyl maleate) is of Formula (IVb):

(IVb)

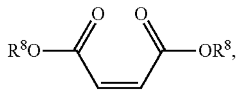

wherein each $R^8$ is alkyl (e.g., $C_2$-$C_{12}$ alkyl).

18. The oil composition of clause 17, wherein each $R^8$ is $C_4$-$C_8$ alkyl (e.g., butyl, pentyl, hexyl, heptyl, or octyl).

19. The oil composition of any one of clauses 1, 2, 4-10, or 16-18, wherein the alkenylene diester (e.g., dialkyl maleate) is dioctyl maleate (DOM), dibutyl maleate (DBM), or a combination thereof.

20. The oil composition of any one of clauses 1, 2, 4-10, or 16-19, wherein the alkenylene diester is a combination of dioctyl maleate (DOM) and dibutyl maleate (DBM).

21. The oil composition of any one of the preceding clauses, wherein the alkenylene diester (e.g., dialkyl fumarate or dialkyl maleate) and the compound of Formula I are present in a ratio of about 5:1 to about 1:5 in the composition.

22. The oil composition of any one of the preceding clauses, wherein the alkenylene diester (e.g., dialkyl fumarate or dialkyl maleate) and the alkyl ricinoleate are present in a ratio of about 1:1 in the composition.

23. The oil composition of any one of the preceding clauses, wherein the oil composition has a viscosity (KV40) of less than about 15 cSt (e.g., about 3 cSt to about 15 cSt).

24. The oil composition of any one of the preceding clauses, wherein the oil composition has an electrical conductivity of less than about 100 nS/m (e.g., about 0.1 nS/m to about 100 nS/m) when measured over a range of about 20° C. to about 150° C.

25. The oil composition of any one of the preceding clauses, wherein the oil composition has a thermal conductivity of greater than about 120 mW/(m*K) (e.g., about 120 mW/(m*K) to about 200 mW/(m*K)) when measured over a range of about 20° C. to about 150° C.

26. The oil composition of any one of the preceding clauses, wherein the oil composition is a base oil (e.g., an automotive base oil), a cooling fluid, or a combination thereof.

27. A base oil composition comprising the oil composition of any one of clauses 1-25.

28. A cooling fluid comprising the oil composition of any one of clauses 1-25.

29. The cooling fluid of clause 28, wherein the cooling fluid is an automotive cooling fluid.

30. The cooling fluid of clause 28 or 29, wherein the cooling fluid is an immersive cooling fluid.

31. An additive for a base oil composition comprising the oil composition of any one of clauses 1-25.

32. The additive of clause 31, wherein the base oil composition is an automotive base oil composition.

33. An additive for a cooling fluid comprising the oil composition of any one of clauses 1-25.

34. The additive of clause 33, wherein the cooling fluid is an automotive cooling fluid.

35. The additive of clause 33 or 34, wherein the cooling fluid is an immersive cooling fluid.

36. A method of cooling an electric drive, comprising adding a composition to the electric drive, wherein the composition comprises the oil composition of any one of clauses 1-25.

37. A process of preparing an oil composition blend comprising the composition according to any one of clauses 1, 2, or 4-25, comprising: combining (i) the alkenylene diester (e.g., dialkyl fumarate or dialkyl maleate) and (ii) the compound of Formula I, and mixing for at least 5 minutes.

38. A process of preparing an oil composition blend comprising the composition according to clause 3, comprising: combining (i) the dialkyl fumarate and (ii) the alkyl ricinoleate, and mixing for at least 5 minutes.

EXAMPLES

The examples and preparations provided below further illustrate and exemplify particular aspects of embodiments of the disclosure. It is to be understood that the scope of the present disclosure is not limited in any way by the scope of the following examples. All ASTM, ISO, and other standard test methods cited or referred to in this disclosure are incorporated by reference in their entirety.

Example 1

Exemplary compatibility and solubility data regarding the oil compositions in accordance with certain aspects of the present disclosure are provided in the instant example. Oil compositions including blends of synthetic-based esters and a bio-based esters were prepared by combining dioctyl fumarate (DOF, Syn-Ester A), dioctyl maleate (DOM, Syn-Ester B), dibutyl fumarate (DBF, Syn-Ester C), dibutyl maleate (DBM, Syn-Ester D), methyl ricinoleate A (Bio-Ester A, B-A), and methyl ricinoleate B (Bio-Ester B, B-B) in the indicated ratios. The exemplary individual oils were analyzed as shown in Table 1, and the exemplary oil blends were analyzed as shown in Table 2, 3a, and 3b. Comparative Ester (Com. Ester, commercial reference fluid) is diisononyl adipate. Oil compositions based on blends of bio-esters and syn-esters demonstrate good solubility in mineral base oil (Gr II MO and Gr III MO). Exemplary esters and ester blends, offer opportunity as a standalone or as blend in mineral base oil.

TABLE 1

Compatibility of the individual esters used in the oil compositions with mineral base oil

| | Bio-Ester A (B-A) | Bio-Ester B (B-B) | Syn-Ester A (DOF) | Syn-Ester B (DOM) | Syn-Ester C (DBF) | Syn-Ester D (DBM) | Com. Ester |
|---|---|---|---|---|---|---|---|
| Gr II MO | Soluble | Soluble | Soluble | Soluble | Soluble | Soluble | Soluble |
| Gr III MO | Soluble | Soluble | Soluble | Soluble | Soluble | Soluble | Soluble |
| Comparative Ester | Soluble | Soluble | Soluble | Soluble | Soluble | Soluble | — |

TABLE 2

Compatibility of the ester blends (1:1) used in the oil compositions with mineral base oil

| | DOF:B-A (1:1) | DOF:B-B (1:1) | DOM:B-B (1:1) | DBF:B-B (1:1) | DOF:DOM (1:1) | DOF:DBM (1:1) |
|---|---|---|---|---|---|---|
| Gr II MO | Soluble | Soluble | Soluble | Soluble | Soluble | Soluble |
| Gr III MO | Soluble | Soluble | Soluble | Soluble | Soluble | Soluble |
| Comparative Ester | Soluble | Soluble | Soluble | Soluble | Soluble | Soluble |

TABLE 3a

| Compatibility of the ester blends with indicated ratios used in the oil compositions with mineral base oil | | | | | | |
|---|---|---|---|---|---|---|
| | DOF:B-B (75:25) | DOM:B-B (75:25) | DBF:B-B (75:25) | DBF:B-B (30:70) | DBM:B-B (75:25) | DBM:B-B (20:80) |
| Gr II MO | Soluble | Soluble | Soluble | Soluble | Soluble | Soluble |
| Gr III MO | Soluble | Soluble | Soluble | Soluble | Soluble | Soluble |
| Comparative Ester | Soluble | Soluble | Soluble | Soluble | Soluble | Soluble |

TABLE 3b

| Compatibility of the ester blends with indicated ratios used in the oil compositions with mineral base oil | | | | |
|---|---|---|---|---|
| | DOM:DBM:B-B (65:10:25) | DOM:DBM:B-B (70:5:25) | DOF:DOM (90:10) | DOM:DBF (90:10) |
| Gr II MO | Soluble | Soluble | Soluble | Soluble |
| Gr III MO | Soluble | Soluble | Soluble | Soluble |
| Comparative Ester | Soluble | Soluble | Soluble | Soluble |

Additional exemplary blends of 75:25 DOF to DOM, 25:75 DOF to DOM, and 75:25 DOF to DBM were soluble in mineral base oil (Gr II MO and Gr III MO) and comparative diisononyl adipate ester (Com. Ester).

Example 2

Exemplary characterizing data regarding the oil compositions in accordance with certain aspects of the present disclosure are provided in the instant example. Oil compositions including blends of synthetic-based esters and a bio-based esters were prepared by combining dioctyl fumarate (DOF, Syn-Ester A), dioctyl maleate (DOM, Syn-Ester B), dibutyl fumarate (DBF, Syn-Ester C), dibutyl maleate (DBM, Syn-Ester D), methyl ricinoleate A (Bio-Ester A, B-A), and methyl ricinoleate B (Bio-Ester B, B-B) in the indicated ratios. Comparative Ester (Com. Ester, commercial reference fluid) is diisononyl adipate. The exemplary individual oils were analyzed as shown in Table 4, and the exemplary oil blends were analyzed as shown in Table 5, 6a, and 6b.

Data were obtained and are presented according to ASTM methods provided herein. Viscosity, KV100 and KV40, was determined according to methods described in ASTM D445. Pour point was determined according to methods described in ASTM D97. Flash point was determined according to methods described in ASTM D93. Noack Volatility was determined according to methods described in ASTM D5800. Entrained water was determined according to methods described in ASTM D6304. Hydrolytic stability as determined according to methods described in ASTM D2619.

TABLE 4

| Properties of the individual esters used in the oil compositions (base oils/cooling fluids) | | | | | | | |
|---|---|---|---|---|---|---|---|
| | Bio-Ester A (B-A) | Bio-Ester B (B-B) | Syn-Ester A (DOF) | Syn-Ester B (DOM) | Syn-Ester C (DBF) | Syn-Ester D (DBM) | Com. Ester (C-A) |
| KV100 (cSt) (D445) | 3.1 | 2.57 | 2.7 | 2.2 | 1.3 | 0.9 | 3.2 |
| KV40 (cSt) (D445) | 14.78 | 9.13 | 10.83 | 8.7 | 3.5 | 3.4 | 12.0 |
| Sp. Gravity | 0.9200 | | 0.9387 | 0.9416 | 0.9843 | 0.994 | 0.922 |
| Pour point (D97) | −29 | | −63 | | | | −60 |
| Flash point (° C.) (D93) | 198 | 180.5 | 198 | 181 | 153 | 148 | 170 |
| Noack Volatility @ 248.6° C. (D5800) | | | | 58% | 91% | 99% | 20.4% |
| Water (D6304) | 0.07% | | 0.04% | | | | 0.1% |
| Hydrolytic stability, ΔTAN (D2619) | 0.03 | | 0.28 | | | | 0.11 |
| Elec. cond. (nS/m) @ 30° C. | 2.4 | 1.1 | 0.3 | 1.1 | 5.2 | 20.4 | 1.0 |
| Elec. cond. (nS/m) @ 100° C. | 18.1 | 6.5 | 5.0 | 3.2 | 52.8 | 291.2 | 15.6 |
| Breakdown voltage (BDV), 1 mm (kV) | 37.5 | | 12.7 | | | | 24.1 |

TABLE 4-continued

Properties of the individual esters used in the oil compositions (base oils/cooling fluids)

| | Bio-Ester A (B-A) | Bio-Ester B (B-B) | Syn-Ester A (DOF) | Syn-Ester B (DOM) | Syn-Ester C (DBF) | Syn-Ester D (DBM) | Com. Ester (C-A) |
|---|---|---|---|---|---|---|---|
| Therm. Cond. (100° C.); (mW/(m*K) @ 100° C. | 151.87 | | 134.4 | | | | 130.9 |
| DSC OIT (° C.) - Air | 212 | | 194 | 198.9 | 190.6 | 207.2 | 199.8 |
| TGA (° C.) - Air | 242 | | 215 | 215 | 164 | 160 | 261.8 |
| Bio-content | 95 | 90 | 0 | | | | |
| Bio-degradability | Expect >75% | Expect >75% | Expect >50% | | | | 78.5% |
| Color (Gardner scale) | | | 0.1 | 0.1 | 0.1 | 0.1 | |

TABLE 5

Properties of the ester blends with indicated ratios used in the oil compositions

| | DOF:B-A (1:1) | DOF:B-B (1:1) | DOM:B-B (1:1) | DBF:B-B (1:1) | DOF:DOM (1:1) | DOF:DBM (1:1) |
|---|---|---|---|---|---|---|
| KV100 (cSt) (D445) | 2.8 | 2.7 | 2.4 | 1.8 | 2.4 | 1.7 |
| KV40 (cSt) (D445) | 11.61 | 9.9 | 8.8 | 5.2 | 9.5 | 5.4 |
| Sp. Gravity | 0.9307 | 0.9397 | 0.9414 | 0.9626 | 0.9405 | 0.9654 |
| Pour point (D97) | −36 | −63 | <−60 | | <−60 | |
| Flash point (° C.) (D93) | >190 | 197 | 187 | 151 | 188 | 146 |
| Noack Volatility @ 248.6° C. (D5800) | | 31% | 48% | <90% | 39.80% | <60% |
| Water (D6304) | 0.3% | 0.05 | 0.06 | 0.08 | 0.02 | 0.03 |
| Hydrolytic stability, ΔTAN (D2619) | 0.52 | 0.05 | | | | |
| Elec. cond. (nS/m) @ 30° C. | 3.2 | 1.4 | 1.6 | 4.0 | 1.8 | 10.8 |
| Elec. cond. (nS/m) @ 100° C. | 34.9 | 12.3 | 10.6 | 22.2 | 12.6 | 7.6 |
| Breakdown voltage (BDV), 1 mm (kV) | 14.6 | 32.9 | 27 | | 30 | |
| Therm. Cond. (100° C.); (mW/(m*K) @ 100° C. | 141.9 | 134.6 | | | | |
| DSC OIT (° C.) - Air | 190 | 185 | >190 | >180 | >190 | >190 |
| TGA (° C.) - Air | 228 | 215 | >220 | >145 | >210 | >180 |
| Bio-content | 50 | 50 | 50 | 50 | 0 | 0 |
| Bio-degradability | Expect >50% | Expect >50% | Expect >50% | Expect >50% | | |
| Color (Gardner scale) | | 0.8 | 0.9 | 0.9 | 0.1 | 0.1 |

TABLE 6a

Properties of the ester blends with indicated ratios used in the oil compositions

| | DOF:B-B (75:25) | DOM:B-B (75:25) | DBF:B-B (75:25) | DBF:B-B (30:70) | DBM:B-B (75:25) | DBM:B-B (20:80) |
|---|---|---|---|---|---|---|
| KV100 (cSt) (D445) | 2.7 | 2.3 | 1.6 | 2.2 | 1.6 | 2.3 |
| KV40 (cSt) (D445) | 10.2 | 8.6 | 4.3 | 6.6 | 4.4 | 7.6 |
| Sp. Gravity | 0.9391 | 0.9411 | 0.9741 | 0.9601 | 0.9798 | 0.9496 |
| Flash point (° C.) (D93) | 197 | 183 | 149 | 156 | 145 | 168 |

TABLE 6a-continued

| Properties of the ester blends with indicated ratios used in the oil compositions | | | | | | |
|---|---|---|---|---|---|---|
| | DOF:B-B (75:25) | DOM:B-B (75:25) | DBF:B-B (75:25) | DBF:B-B (30:70) | DBM:B-B (75:25) | DBM:B-B (20:80) |
| Noack Volatility @ 248.6° C. (D5800) | <30% | <60% | <90% | <50% | <90% | <70% |
| Water (D6304) | | 0.04 | | | | |
| DSC OIT (° C.) - Air | >180 | >190 | >180 | >190 | >190 | >190 |
| TGA (° C.) - Air | >190 | >190 | >145 | >180 | >145 | >180 |
| Bio-content | 20 | 20 | 20 | 60 | 20 | 70 |
| Color (Gardner scale) | 0.5 | 0.5 | 0.5 | 1 | 0.5 | 1.2 |

TABLE 6b

| Properties of the ester blends with indicated ratios used in the oil compositions | | | | |
|---|---|---|---|---|
| | DOM:DBM:B-B (65:10:25) | DOM:DBM:B-B (70:5:25) | DOF:DOM (90:10) | DOM:DBF (90:10) |
| KV100 (cSt) (D445) | 2.1 | 2.2 | 2.6 | 2 |
| KV40 (cSt) (D445) | 7.8 | 8.4 | 10.5 | 7.1 |
| Sp. Gravity | 0.9481 | 0.9461 | 0.9378 | 0.9479 |
| Pour point (D97) | <−60 | | <−60 | <−60 |
| Flash point (° C.) (D93) | 167 | 175 | 194 | 168 |
| Noack Volatility @ 248.6 C. (D5800) | | <70% | 35.10% | 52.50% |
| Water (D6304) | 0.04 | 0.04 | 0.02 | 0.06 |
| Elec. cond. (nS/m) @ 30 C. | 1.9 | | 0.7 | 0.8 |
| Breakdown voltage (BDV), 1 mm (kV) | 22.4 | | 32.3 | 30.9 |
| Bio-content | 20 | 20 | 0 | 0 |
| Color (Gardner scale) | 0.1 | 0.2 | 0.1 | 0.1 |

Example 3: Electrical Conductivity

Figure 2:
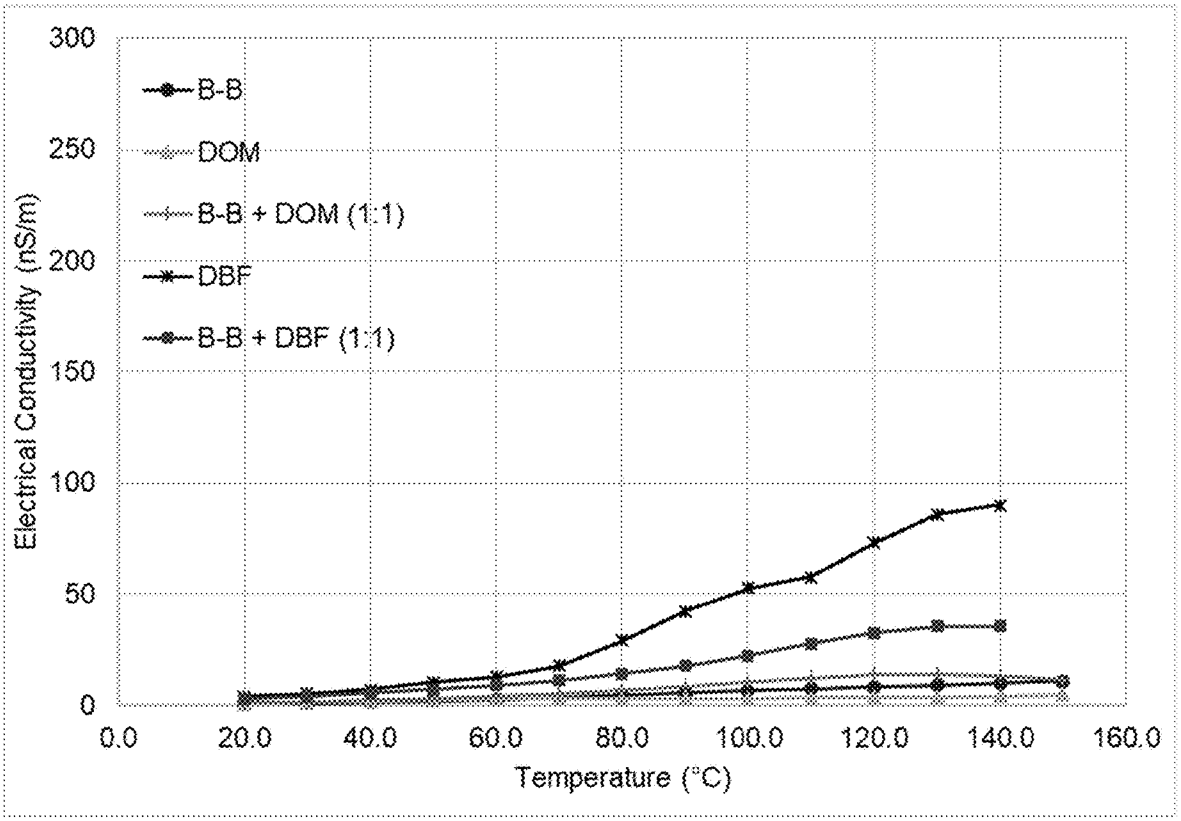
FIG. 2 shows a graph of electrical conductivity vs. temperature of different esters and ester blends. Bio-ester B (B-B) is methyl ricinoleate B, Syn-ester B is dioctyl maleate (DOM), and Syn-ester C is dibutyl fumarate (DBF).
Figure 3:
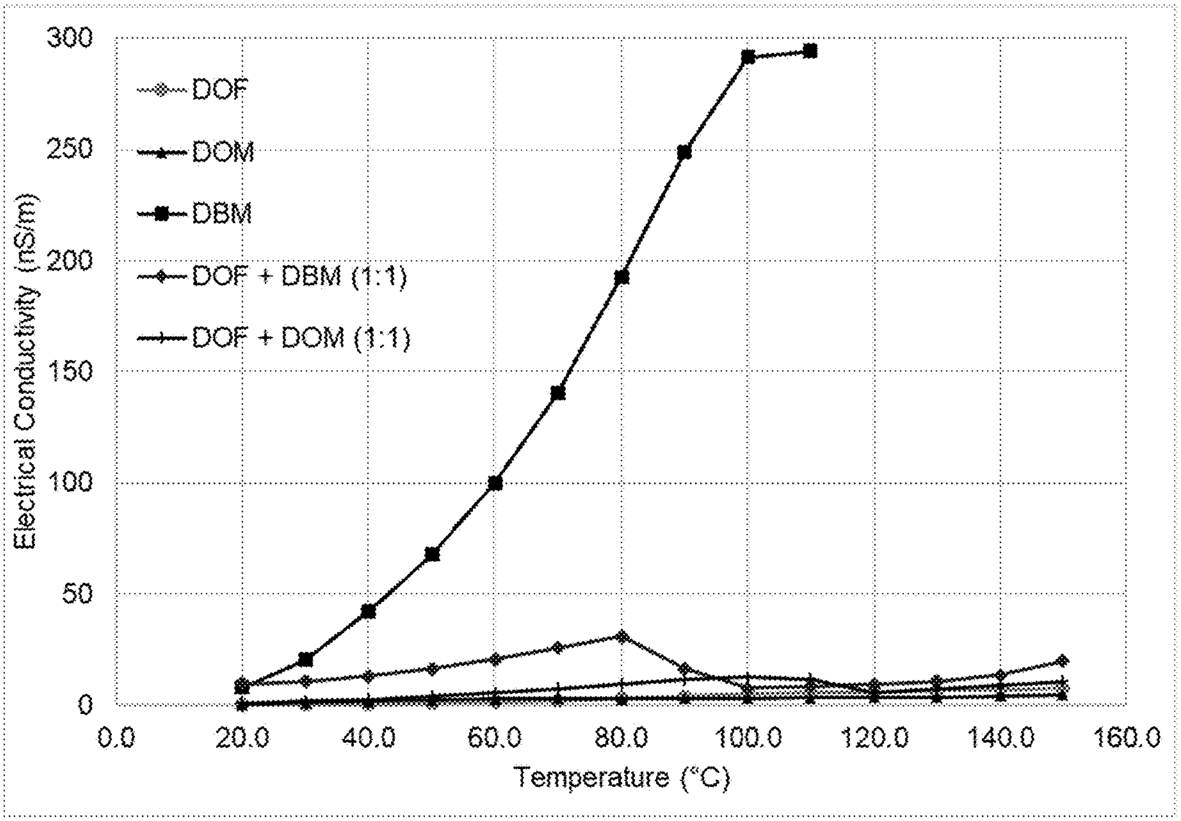
FIG. 3 shows a graph of electrical conductivity vs. temperature of different esters and ester blends. Syn-ester A is dioctyl fumarate (DOF), Syn-ester B is dioctyl maleate (DOM), and Syn-ester D is dibutyl maleate (DBM).

The conductivity measurements were run using Epsilon+ Dielectricity Meter according to the requirements of DIN EN 51 111 test standard. Measurement of the specific electrical conductivity of was run in neat condition with applied frequency 20 Hz over a broad temperature range of 20 to 150° C. For blends, (e.g., 1:1 ratio), individual components were mixed at room temperature and stirred for 30 min. All tests were conducted on the resulting blends without any further processing. Results are shown in FIGS. 1-3.

Example 4: Thermal Conductivity

Figure 4:
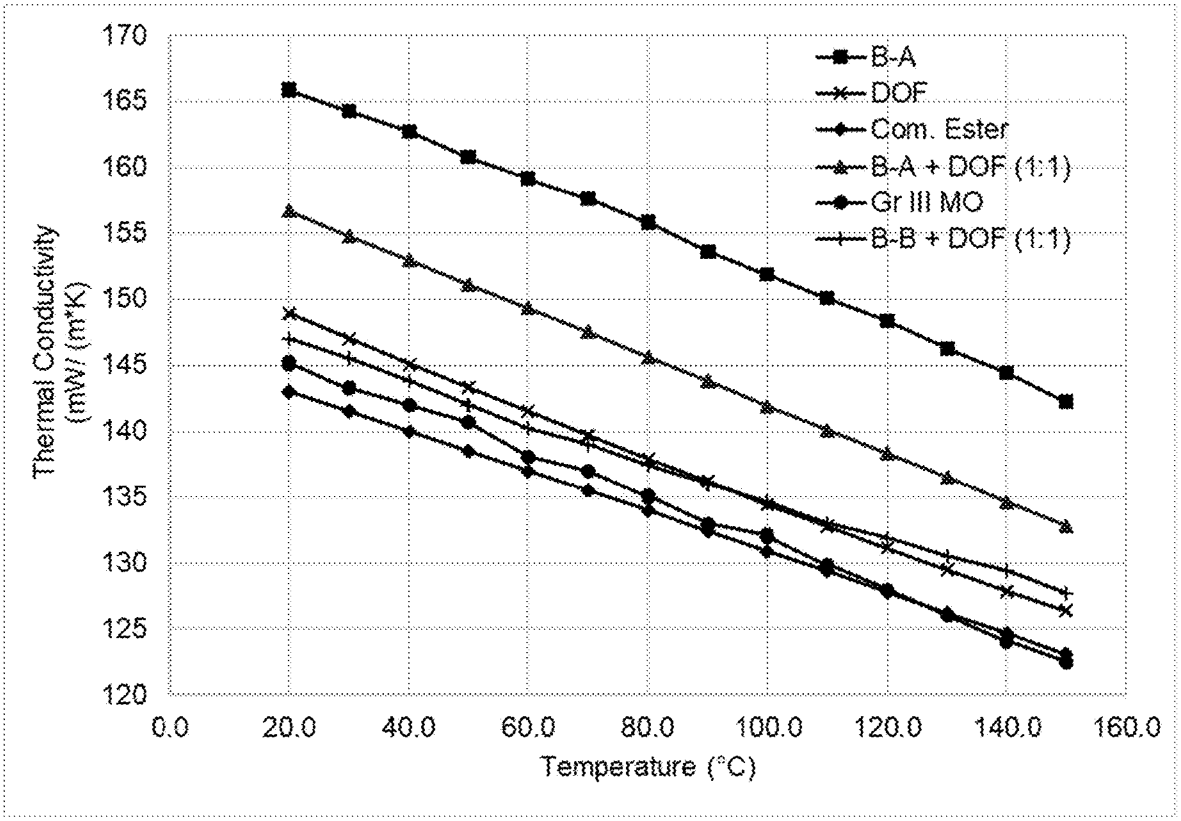
FIG. 4 shows a graph of thermal conductivity vs. temperature of different esters and ester blends. Bio-ester A (B-A) is methyl ricinoleate A, Bio-ester B (B-B) is methyl ricinoleate B, Syn-ester A is dioctyl fumarate (DOF), Gr III MO is a grade III mineral oil, and Comparative ester (Com. Ester) is diisononyl adipate.

Thermal conductivity of the fluids were measured using Flucon Lambda Thermal conductivity meter. The test is based on the hot-wire method and was run according to ASTM D7896-19. The test method is designed to measure thermal conductivity of test sample in the temperature range up to 300° C. Depending on the application, in this case, the equipment was set up to measure temperature profile in the range 20-150° C. Results are shown in FIG. 4.

Example 5: High Frequency Reciprocating Rig (HFRR)

Figure 5:
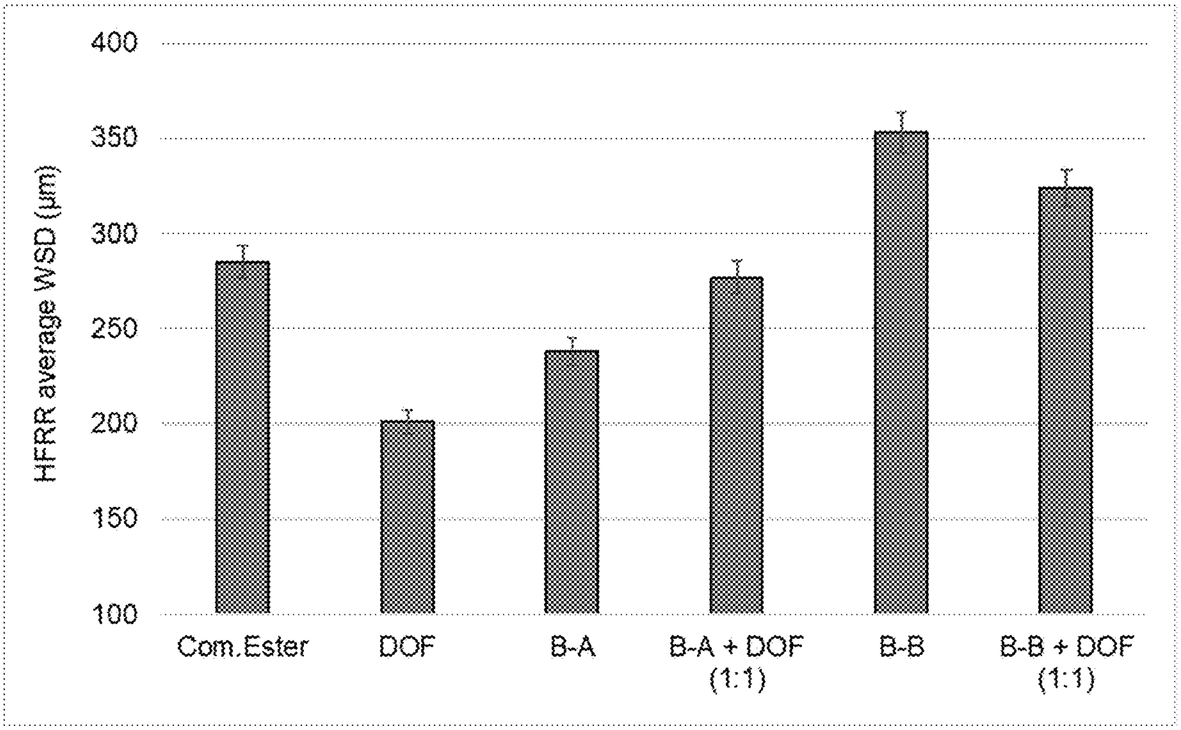
FIG. 5 shows a graph of high frequency reciprocating rig (HFRR) average wear scar diameter (WSD) of different esters and ester blends. Bio-ester A (B-A) is methyl ricinoleate A, Bio-ester B (B-B) is methyl ricinoleate B, Syn-ester A is dioctylfumarate (DOF), and Comparative ester (Com. Ester) is diisononyl adipate.
Figure 6:
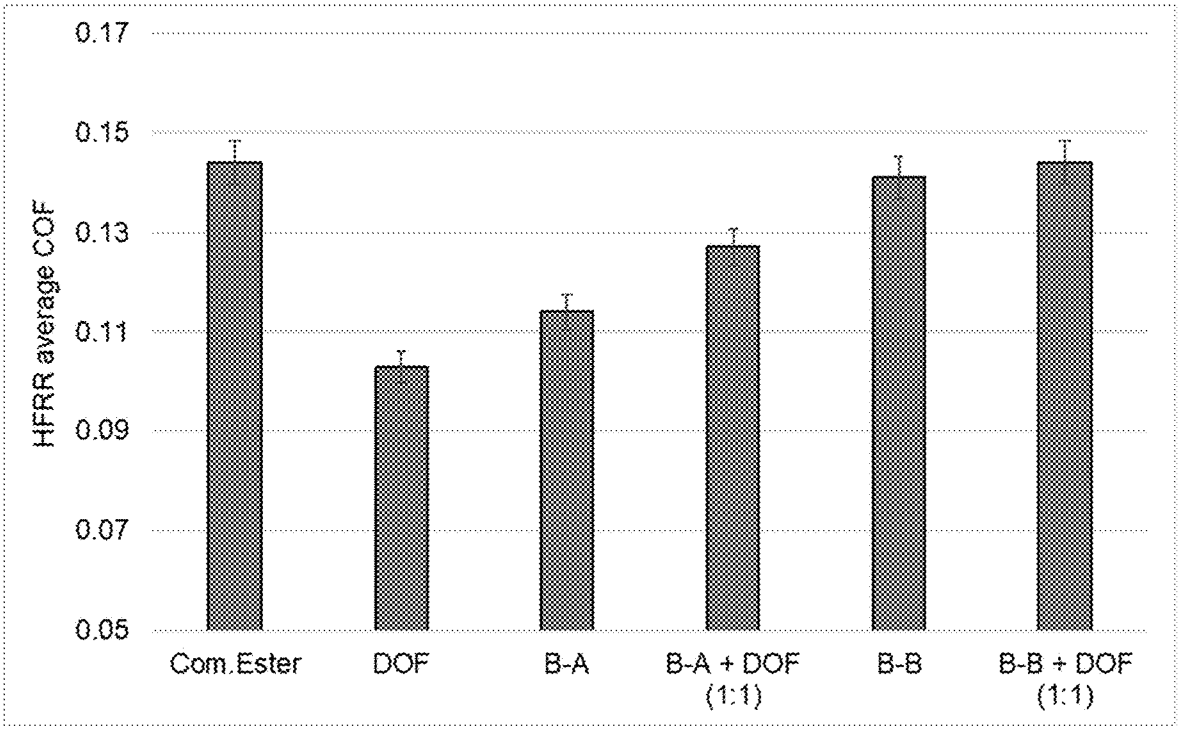
FIG. 6 shows a graph of HFRR average coefficient of friction (COF) of different esters and ester blends. Bio-ester A (B-A) is methyl ricinoleate A, Bio-ester B (B-B) is methyl ricinoleate B, Syn-ester A is dioctyl fumarate (DOF), and Comparative ester (Com. Ester) is diisononyl adipate.

High frequency reciprocating rig (HFRR) is an industry recognized test for measuring the lubricity of fuels and lubricants. Lubricity is a critical parameter of fluid quality and is important to maintain proper functioning of the fuel injection system hardware. Industry has adopted the following standard tests to quantify the suitability of fuels for lubricity requirements: CEC F-06-A-96, ASTM D6079, ASTM 7688, ISO BS EN 590, ISO 12156-1, JPI-5S-50-98 and IP 450/2000. The test procedure involves high frequency (50 Hz) repeated rubbing of a 5 mm alloy steel ball on a 10 mm alloy steel disk under 8 N load in the presence of a fluid sample maintained at 60° C. for 75 minutes. Wear scar diameter (WSD) on the ball was measured in both parallel and perpendicular to the sliding direction, and the average wear scar was reported. Coefficient of Friction (COF) was also measured. The results are shown in Tables 7, 8, and 9 and FIGS. 5-6.

TABLE 7

| High frequency reciprocating rig (HFRR) test data. | | |
|---|---|---|
| | Ave. WSD (μm) | Ave. COF |
| Bio-Ester A (B-A) | 238 ± 3% | 0.114 ± 0.003% |
| Bio-ester B (B-B) | 353 ± 3% | 0.141 ± 0.003% |
| Syn-Ester A (DOF) | 201 ± 3% | 0.103 ± 0.003% |
| Comparative Ester (diisononyl adipate) | 285 ± 3% | 0.144 ± 0.003% |

TABLE 7-continued

| High frequency reciprocating rig (HFRR) test data. | | |
|---|---|---|
| | Ave. WSD (μm) | Ave. COF |
| Bio-ester A (B-A) + Syn-Ester A (DOF) (1:1) | 280 ± 3% | 0.127 ± 0.003% |
| Bio-ester B (B-B) + Syn-Ester A (DOF) (1:1) | 324 ± 3% | 0.144 ± 0.003% |

TABLE 8

| High frequency reciprocating rig (HFRR) test data of synthetic esters and blends. | | |
|---|---|---|
| | Ave. WSD (μm) | Ave. COF |
| Group III Mineral Oil | 402 ± 3% | 0.201 ± 0.003% |
| Comparative Ester (diisononyl adipate) | 285 ± 3% | 0.144 ± 0.003% |
| Syn-Ester A (DOF) | 208 ± 3% | 0.110 ± 0.003% |
| Syn-Ester-B (DOM) | 201 ± 3% | 0.147 ± 0.003% |
| Syn-Ester A (DOF) + Syn-Ester-B (DOM) (1:1) | 193 ± 3% | 0.136 ± 0.003% |
| Syn-Ester A (DOF) + Syn-Ester-B (DOM) (90:10) | 200 ± 3% | 0.133 ± 0.003% |
| Syn-ester-B (DOM) + Syn-Ester-C (DBF) (90:10) | 190 ± 3% | 0.136 ± 0.003% |

TABLE 9

| High frequency reciprocating rig (HFRR) test data of bio-ester blends in Comparative Ester | | |
|---|---|---|
| | Ave. COF | % drop in COF (Ave.) |
| Comparative Ester (diisononyl adipate) | 0.144 | — |
| 1 wt % Bio-Ester A (B-A) in Comparative Ester (diisononyl adipate) | 0.141 | 2 |
| 5 wt % Bio-Ester A (B-A) in Comparative Ester (diisononyl adipate) | 0.132 | 9 |
| 10 wt % Bio-Ester A (B-A) in Comparative Ester (diisononyl adipate) | 0.127 | 13 |
| 50 wt % Bio-Ester A (B-A) in Comparative Ester (diisononyl adipate) | 0.128 | 12 |

Example 6: Stability and Flock Formation

Figure 7A:
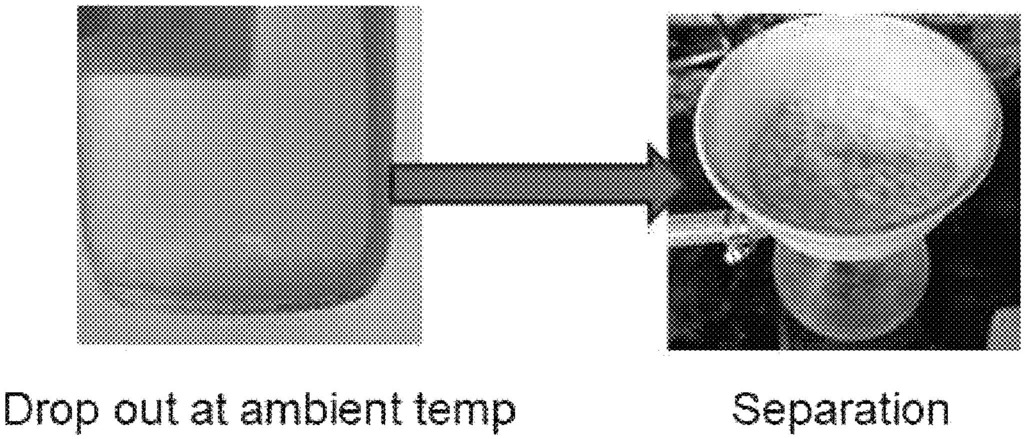
FIG. 7A shows an image of flocculant ("flock") formation and separation from an oil composition comprising Bio-ester A (methyl ricinoleate A).
Figure 7B:
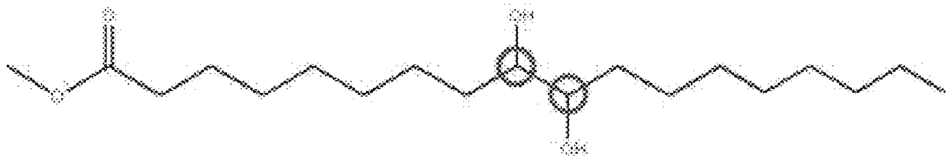
FIG. 7B shows an illustrative diol present in an isolated flock from an oil composition comprising Bio-ester A (methyl ricinoleate A).
Figure 7C:
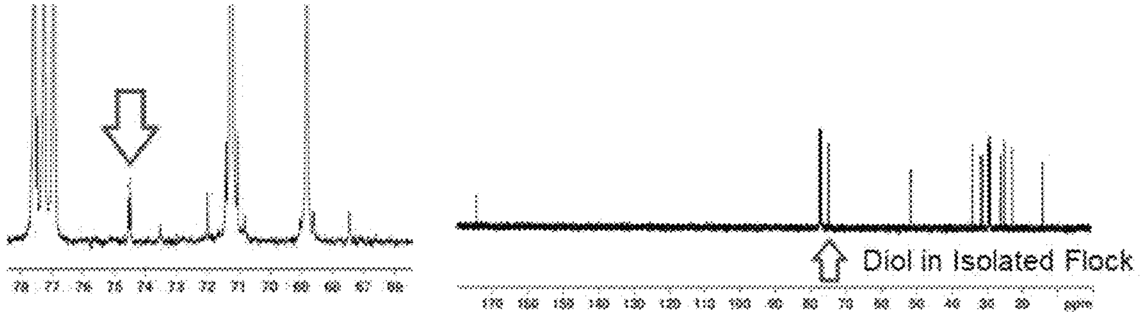
FIG. 7C shows an $^{1}H$ nuclear magnetic resonance (NMR) spectrum (left) and a $^{13}C$ NMR spectrum (right) of an isolated flock from an oil composition comprising Bio-ester A (methyl ricinoleate A). Arrows indicated protons and carbons corresponding to the formation of a diol.

Components were blended in a flat bottom glass bottle at room temperature (about 25° C.) for 30 minutes. Resulting blends were stored at room temperature (about 25° C.) for 5 days and separately in a lab refrigerator (0° C.) for 5 days. Any drop out/precipitate (after 5 days) at the bottom of the glass bottle was recorded as flock. The results are shown in Table 10. A sample flock was separated and analyzed as shown in FIGS. 7A-7C.

TABLE 10

| Ambient and low temperature stability of bio-ester and blends | | |
|---|---|---|
| | Storage stability (25° C.); 5 days | Storage stability (0° C.); 5 days |
| Bio-Ester A (B-A) | Flock observed | Flock observed |
| Bio-Ester A (B-A) + Syn-Ester A (DOF) (1:1) | Flock observed | Flock observed |
| Bio-Ester B (B-B) | Clear | Clear |
| Bio-Ester B (B-B) + Syn-Ester A (DOF) (1:1) | Clear | Clear |

What is claimed is:

1. An oil composition comprising a blend of (i) an alkenylene diester and (ii) a compound of Formula I, (I)

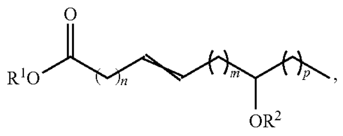

or salt thereof, wherein $R^1$ is $C_1$-$C_6$ alkyl, $R^2$ is H or $C_1$-$C_6$ acyl, and each of n, m, and p is independently an integer of 1, 2, 3, 4, 5, 6, 7, 8, 9, or 10.

2. The oil composition of claim 1, wherein the compound of Formula I is of Formula IIa:

(IIa)

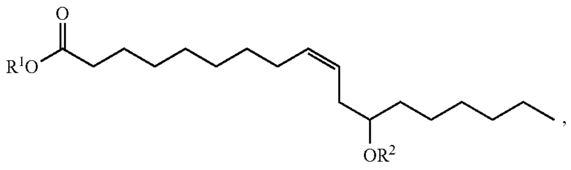

or salt thereof, wherein $R^1$ is $C_1$-$C_6$ alkyl and $R^2$ is H or $C_1$-$C_6$ acyl.

3. The oil composition of claim 2, wherein $R^1$ is methyl, ethyl, or propyl.

4. The oil composition of claim 3, wherein $R^2$ is H or acetyl.

5. The oil composition of claim 4, wherein the alkenylene diester is of Formula III:

(III)

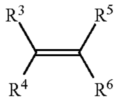

wherein each of $R^3$, $R^4$, $R^5$, and $R^6$ is independently H or —C(O)Oalkyl, provided that:

one of $R^3$ and $R^4$ is H and the other of $R^3$ and $R^4$ is —C(O)Oalkyl, and one of $R^5$ and $R^6$ is H and the other of $R^5$ and $R^6$ is —C(O)Oalkyl.

6. The oil composition of claim 5, wherein the alkenylene diester is a dialkyl fumarate, a dialkyl maleate, or a combination thereof.

7. The oil composition of claim 6, wherein the alkenylene diester is a dialkyl fumarate.

8. The oil composition of claim 7, wherein the alkenylene diester is of Formula (IVa):

(IVa)

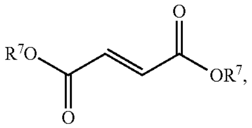

wherein each $R^7$ is $C_2$-$C_{12}$ alkyl.

9. The oil composition of claim 8, wherein each $R^7$ is $C_4$-$C_8$ alkyl.

10. The oil composition of claim 9, wherein the alkenylene diester is dioctyl fumarate (DOF), dibutyl fumarate (DBF), or a combination thereof.

11. The oil composition of claim 6, wherein the alkenylene diester is a dialkyl maleate.

12. The oil composition of claim 11, wherein the alkenylene diester is of Formula (IVb):

(IVb)

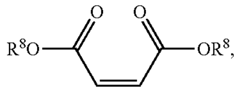

wherein each $R^8$ is $C_2$-$C_{12}$ alkyl.

13. The oil composition of claim 12, wherein each $R^8$ is $C_4$-$C_8$ alkyl.

14. The oil composition of claim 13, wherein the alkenylene diester is dioctyl maleate (DOM), dibutyl maleate (DBM), or a combination thereof.

15. The oil composition of claim 14, wherein the alkylene diester is a combination of dioctyl maleate (DOM) and dibutyl maleate (DBM).

16. The oil composition of claim 6, wherein the alkenylene diester and the compound of Formula I are present in a ratio of about 5:1 to about 1:5 in the composition.

17. A base oil composition comprising the oil composition of claim 1.

18. A cooling fluid comprising the oil composition of claim 1.

19. The cooling fluid of claim 18, wherein the cooling fluid is an immersive cooling fluid.

20. A method of cooling an electric drive, comprising adding a composition to the electric drive, wherein the composition comprises a blend of (i) an alkenylene diester and (ii) a compound of Formula I, (I)

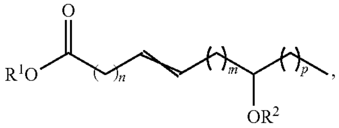

or salt thereof, wherein $R^1$ is $C_1$-$C_6$ alkyl, $R^2$ is H or $C_1$-$C_6$ acyl, and each of n, m, and p is independently an integer of 1, 2, 3, 4, 5, 6, 7, 8, 9, or 10.

* * * * *